(12) United States Patent
Kodama et al.

(10) Patent No.: US 8,670,451 B2
(45) Date of Patent: Mar. 11, 2014

(54) NETWORK SYSTEM, TERMINAL, AND GATEWAY

(75) Inventors: Takeshi Kodama, Kawasaki (JP); Tetsumei Tsuruoka, Kawasaki (JP); Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 11/451,126

(22) Filed: Jun. 12, 2006

(65) Prior Publication Data

US 2007/0192434 A1 Aug. 16, 2007

(30) Foreign Application Priority Data

Feb. 13, 2006 (JP) ................................ 2006-035070

(51) Int. Cl.
*H04L 12/28* (2006.01)
(52) U.S. Cl.
USPC ............ 370/401; 370/400; 370/402; 370/404
(58) Field of Classification Search
USPC ......... 370/474, 390, 392, 389, 395, 428, 352, 370/398–401, 465, 521; 709/218, 238, 216, 709/217, 246, 223, 230; 713/154, 155
See application file for complete search history.

(56) References Cited

U.S. PATENT DOCUMENTS

| 7,593,337 B2 | 9/2009 | Oguchi et al. | |
| 2002/0003803 A1* | 1/2002 | Kametani | 370/401 |
| 2003/0185207 A1* | 10/2003 | Nakahara | 370/389 |
| 2004/0054902 A1* | 3/2004 | Fujimoto et al. | 713/168 |
| 2004/0087344 A1* | 5/2004 | Parra et al. | 455/562.1 |
| 2004/0170133 A1 | 9/2004 | Oguchi et al. | |
| 2004/0215819 A1* | 10/2004 | Tsuruoka et al. | 709/238 |
| 2004/0240424 A1* | 12/2004 | Fong et al. | 370/349 |
| 2005/0089024 A1* | 4/2005 | Bergeron et al. | 370/352 |

FOREIGN PATENT DOCUMENTS

| JP | 2004-304318 | 10/2004 |
| JP | 2004-320694 | 11/2004 |
| JP | 2007-60610 | 3/2007 |

OTHER PUBLICATIONS

Optimization by NAT Transversal and UPnP of Windows™ XP (with English entitled Overview of Network Address Translation (NAT) in Windows XP) http://www.microsoft.com/technet/prodtechnol/winxppro/deploy/nattrnsv.mspx#EHAA.
Notice of Rejection dated Feb. 22, 2011, from corresponding Japanese Application No. 2006-035070.

* cited by examiner

*Primary Examiner* — Anez Ebrahim
(74) *Attorney, Agent, or Firm* — Katten Muchin Rosenman LLP

(57) ABSTRACT

A virtual interface having a global address of a physical interface on an Internet side of a gateway is provided in a terminal. An application unit of the terminal transmits a packet to the Internet using the virtual interface. The packet is transferred to the gateway through a downlink transfer path. The gateway transmits the packet from the physical interface on the Internet side to the Internet.

10 Claims, 35 Drawing Sheets

FIG.7
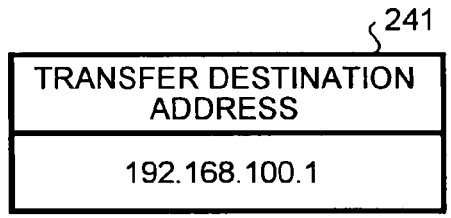
| TRANSFER DESTINATION ADDRESS | 241 |
|---|---|
| 192.168.100.1 | |
FIG.8
242
| DESTINATION ADDRESS | DESTINATION IF |
|---|---|
| 192.168.100.0/24 | eth2 |
| 120.1.1.0/24 | vif0 |
| 192.168.100.10 | NONE |
FIG.9
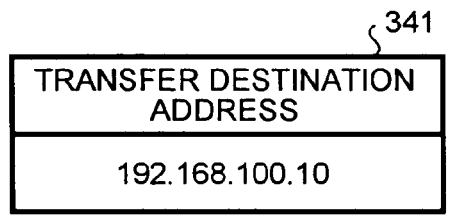
| TRANSFER DESTINATION ADDRESS | 341 |
|---|---|
| 192.168.100.10 | |
FIG.10
342
| DESTINATION ADDRESS | DESTINATION IF |
|---|---|
| 192.168.100.0/24 | eth1 |
| 120.1.1.0/24 | eth0 |
| 120.1.1.1 | NONE |
| 192.168.100.1 | NONE |

NETWORK SYSTEM, TERMINAL, AND GATEWAY

CROSS-REFERENCE TO RELATED APPLICATIONS

This application is based upon and claims the benefit of priority from the prior Japanese Patent Application No. 2006-035070, filed on Feb. 13, 2006, the entire contents of which are incorporated herein by reference.

BACKGROUND OF THE INVENTION

1. Field of the Invention

The present invention relates to a network system, a terminal, and a gateway.

2. Description of the Related Art

Transmission control protocol/Internet protocol (TCP/IP) is well known as a protocol used in communication between terminals. TCP/IP is used for the Internet as a standard. It is necessary to specify an internet protocol (IP) address and a port number of the counterpart in communication to transmit data using TCP/IP. An IP address is address information that uniquely identifies a terminal connected to the Internet, and is assigned to each terminal. Conventionally, a unique IP address that can be used to connect to the Internet (hereinafter, "global address") is assigned to each of all terminals.

However, the number of 32-bit IP addresses used currently (IPv4) may become insufficient in future as the Internet become widespread. A method is well known in which in a closed network in a small extent such as a local area network (LAN) used inside a home or a company, IP addresses (hereinafter, "private address") that are available only inside the LAN are freely assigned to terminals connected to the LAN to save the number of global addresses. In this specification, a LAN is referred to as "private network".

Because a terminal provided with a private address can not be identified uniquely on the Internet, the terminal as it is can not communicate with other apparatuses through the Internet. As a technique to connect a terminal in a private network with the Internet, network address port translation (NAPT) is well known. In a gateway (router) positioned on the border between a private network and the Internet, NAPT converts a private address into a global address for packets sent from the private network side to the Internet side, and a global address into a private address for packets sent from the Internet side to the private network side.

Because NAPT further converts port numbers for TCP/UDP, a plurality of terminals in a private network can be simultaneously connected to the Internet using a single global address. A network system in which local communication apparatuses in different LANs can communicate mutually through the Internet is well known (for example, Japanese Patent Application Laid-Open Publication No. 2004-304318). In the network system, the address converting function by NAPT is used.

Universal plug and play (UPnP) network address translation (NAT) traversal is well known (for example, "optimization by NAT transversal and UPnP of Windows™ XP", [on-line], Microsoft Japan, [searched on Dec. 2, 2004], the Internet <URL: http://www.microsoft.com/japan/technet/prodtechnol/winxppro/deploy/nattrnsv.mspx#EHAA>) as a technique that connects terminals in a private network with the Internet without mutual conversion between private addresses and global addresses in a gateway. An application and a gateway communicate with each other when the application is started up on a terminal, and the application acquires a global address of the gateway as well as the gateway sets port mapping for the gateway to transfer packets to a port used by the application. Thus, the application on the terminal can communicate using a global address.

However, the connection to the Internet using NAPT described above has a problem as follows. For example, NAPT creates a conversion rule between IP addresses and port numbers when packets are transmitted from a terminal in a private network to the Internet side. Therefore, when communication is started from the Internet side to a terminal in a private network, no conversion rule has been created for the communication. Therefore, no communication can be started from the Internet side to the terminal in the private network except when a port number used by an application on the terminal has been recognized and a conversion rule has been statically set in advance using the port number.

Because NAPT converts basically only an IP address and a port number in the TCP header part, malfunction occurs for a protocol that is arranged to contain an IP address and a port number in the data part. For example, for a call control protocol such as a session initiation protocol (SIP) utilized for the IP telephone service, etc., an SIP server takes out an IP address contained in the data part and uses the IP address as the address for a response.

Therefore, when NAPT is used for such a protocol, a response packet from the SIP server becomes address-unknown and does not reach a terminal originally addressed to because the IP address contained in the data part under SIP is not converted and remained as a private address. Recently, another type of NAPT that has a function of re-writing an IP address in the data part has also been proposed. However, because available protocols are limited for such NAPT, it is not practical for such NAPT to make compatible with new protocols that are being developed one after another.

For NAPT, a port number can not be converted when the port number is encrypted. For example, in encryption using IP security (IPsec), a new packet is configured by encrypting the parts following the IP header of the original packet and attaching the IP header and header information for encryption called encapsulation security payload (ESP) before the encrypted data. In this re-configured packet, the ESP header is positioned at the position at which the conventional TCP/IP header has been positioned.

Therefore, because no port number part exists when a conversion rule is created by the NAPT, no correct conversion rule can be created. Even though the position of the TCP/UDP header of the original packet can be found in the packet re-configured by the encrypting by IPsec, no correct port number can be acquired because the part has been encrypted. Therefore, in this case, no correct conversion rule can also be created.

In case of connection with the Internet using UPnP NAT traversal, it is possible to start communication from the Internet side by setting port mapping at the starting up of an application. However, in this case, the dedicated application program interface (API) is required. Therefore, to cause a conventional application to support UPnP, the application itself is required to be corrected. However, the source code of an application is generally not disclosed. Therefore, the source code can not be corrected individually. Even if source codes of applications are disclosed, it is not practical to correct many applications being used.

SUMMARY OF THE INVENTION

It is an object of the present invention to at least solve the above problems in the conventional technologies.

A network system according to one aspect of the present invention includes a gateway device arranged on a border between a public network and a private network, and configured to relay data communicated therebetween; a terminal located in the private network, including a virtual interface that corresponds to a physical interface of the gateway on a public network side, and configured to transmit and receive data to and from other terminals located on the public network through the virtual interface; and a transfer path configured to transfer data between the physical interface and the virtual interface.

A terminal according to another aspect of the present invention includes a virtual interface configured to correspond to a physical interface of a gateway on a public network side, the gateway arranged on a border between a public network and a private network and configured to relay data communicated therebetween. The terminal is configured to transmit and receive data to and from other terminals located on the public network through the virtual interface using a global address assigned to the physical interface.

A gateway according to still another aspect of the present invention is used in a network system according to the above aspect. The gateway includes a path setting unit configured to set an uplink transfer path for transferring data to a terminal located in the private network; a data transferring unit configured to transfer data received from a terminal on the public network, to the terminal in the private network through the uplink transfer path; and a data receiving unit configured to receive data transferred from the terminal in the private network and to transmit the data to the public network.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a schematic for illustrating a transfer table of a terminal according to the first embodiment:

FIG. 8 is a schematic for illustrating a route table of the terminal according to the first embodiment:

FIG. 9 is a schematic for illustrating a transfer table of a gateway according to the first embodiment;

FIG. 10 is a schematic for illustrating a route table of the gateway according to the first embodiment;

DETAILED DESCRIPTION OF THE PREFERRED EMBODIMENTS

Exemplary embodiments according to the present invention will be explained in detail below with reference to the accompanying drawings.

Figure 1:
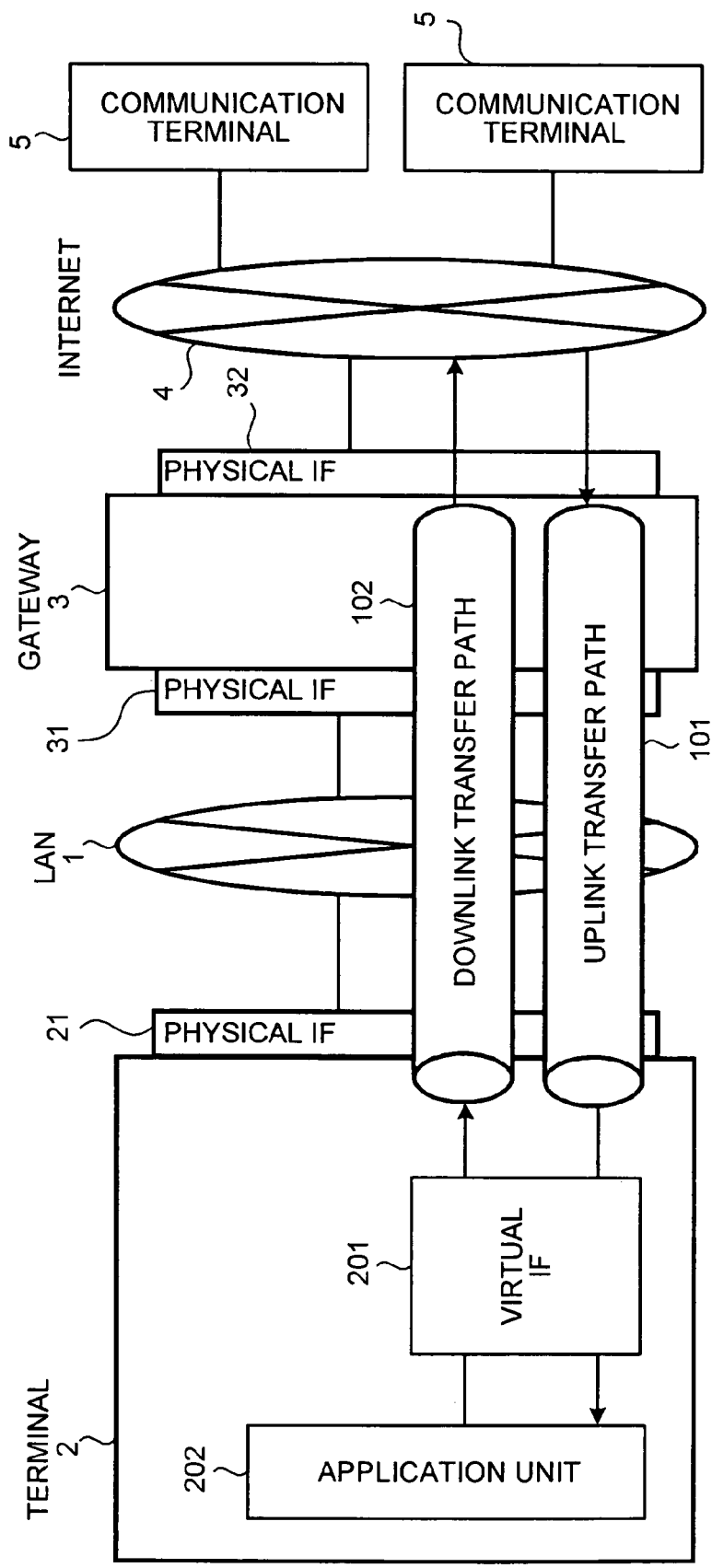
FIG. 1 is a schematic of a network system according to embodiments of the present invention.
Figure 2:
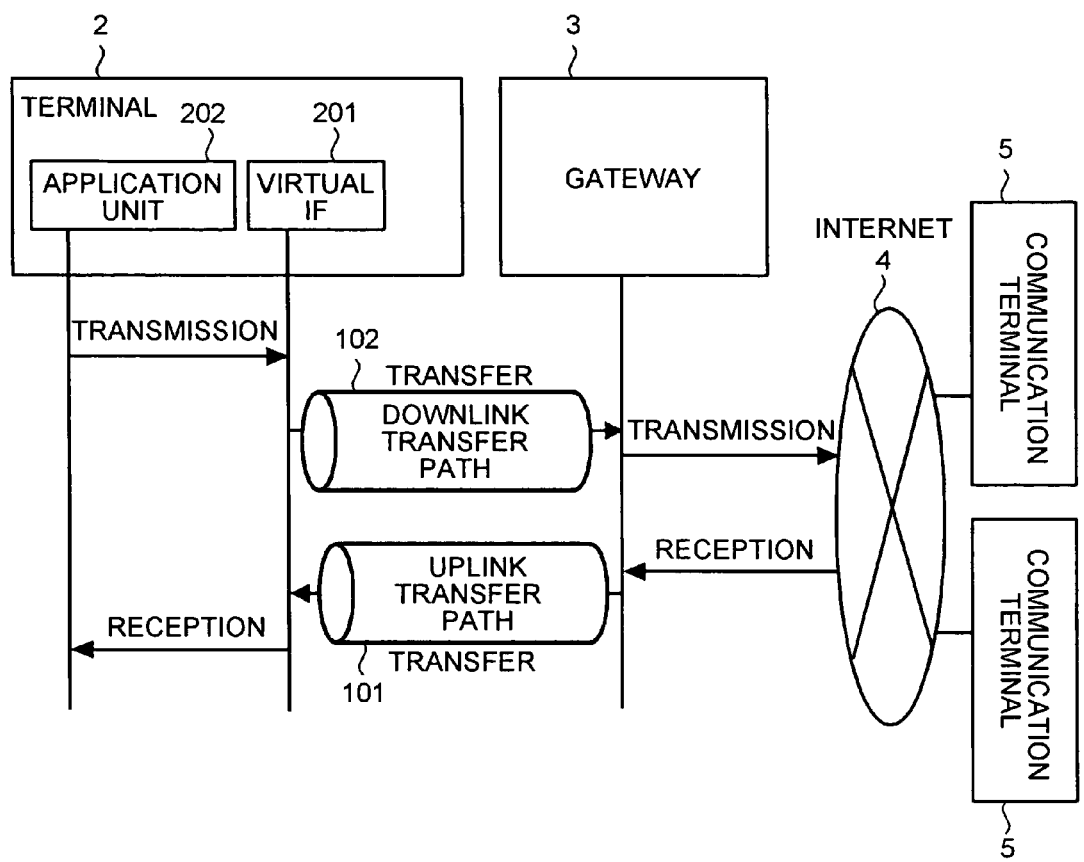
FIG. 2 is a schematic for illustrating a sequence of data transfer processing by the network system according to the embodiments.

FIG. 1 is a schematic for illustrating a principle of a network system according to embodiments of the present invention. FIG. 2 is a schematic for illustrating a sequence of data transfer processing by the network system according to the embodiments. The network system includes a LAN 1, and a terminal 2. A private network is constructed with the LAN 1 and the terminal 2. The terminal 2 is connected to the LAN 1 through a physical interface 21. To the physical interface 21, a private address only valid within the private network is assigned.

As shown in FIG. 1, the network system includes a gateway 3 and the Internet 4. The gateway 3 is arranged on a boarder between the private network and the Internet 4. The gateway 3 is connected to the LAN 1 through a physical interface 31 on a LAN side, and is connected to the Internet 4 through a physical interface 32 on an Internet side to relay a packet between the private network and the Internet 4. To the interface 32, a global address is assigned. Communication terminals 5 are connected to the Internet 4.

The terminal 2 creates therein a virtual interface 201 that corresponds to the physical interface 32 of the gateway 3. The terminal 2 includes an application unit 202. The application unit is software to perform communication with the communication terminals 5 on the Internet 4. The application unit uses the virtual interface 201 to transmit a packet to the communication terminals 5.

The virtual interface 201 manages attributes including an IP address, a subnet mask, a maximum transmission unit (MTU), a metric, and an attribute/state flag. An IP address is express as, for example, [192.168.100.1]. The subnet mask defines a bit amount to be used to recognize a network among the IP address, and is expressed as, for example, [255.255.255.0]. The MTU is a value of a maximum transmission unit of a packet expressed in bite (for example, 1500). The metric is a value used to determine an optimal route by a routing algorithm (for example, 1). The attribute/state flag indicates an attribute and a state of an interface. For example, when the attribute/state flag is "UP", the interface is active, and when "DOWN", the interface is not active.

A packet transmitted to the virtual interface 201 by the application unit 202 is transferred to the gateway 3 through a downlink transfer path 102 set to the LAN 1. The gateway 3 transmits the transferred packet to the Internet 4. On the other hand, a packet transferred to the terminal 2 from the gateway 3 is transferred to the virtual interface 201 through an uplink transfer path 101 set to the LAN 1. The packet is then transferred from the virtual interface 201 to the application unit 202. The uplink transfer path 101 and the downlink transfer path 102 are set when the application unit 202 opens a communication port with respect to the virtual interface 201.

Figure 3:
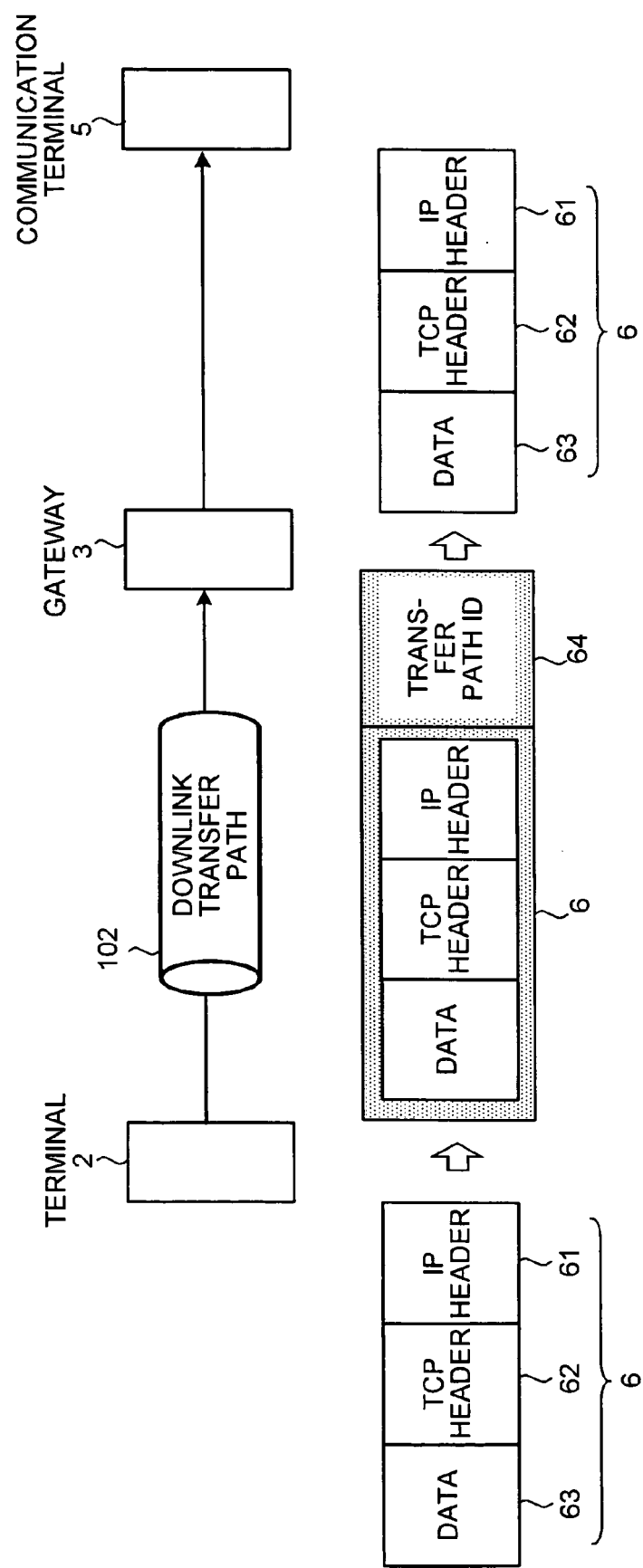
FIG. 3 is a schematic for illustrating a transition of packet formats in downlink transfer in the network system according to the embodiments.

FIG. 3 is a schematic for illustrating a transition of packet formats in downlink transfer in the network system. In the downlink transfer, a transfer path ID 64 to identify the downlink transfer path 102 is added, in the terminal 2, to a packet 6 including an IP header 61, a TCP header 62, and data 63. The transfer path ID 64 is deleted in the gateway 3. The IP header 61 has a global address of the physical interface 32 as an IP address of a transmission source, and a global address of the communication terminals 5 as a transmission destination IP address.

Figure 4:
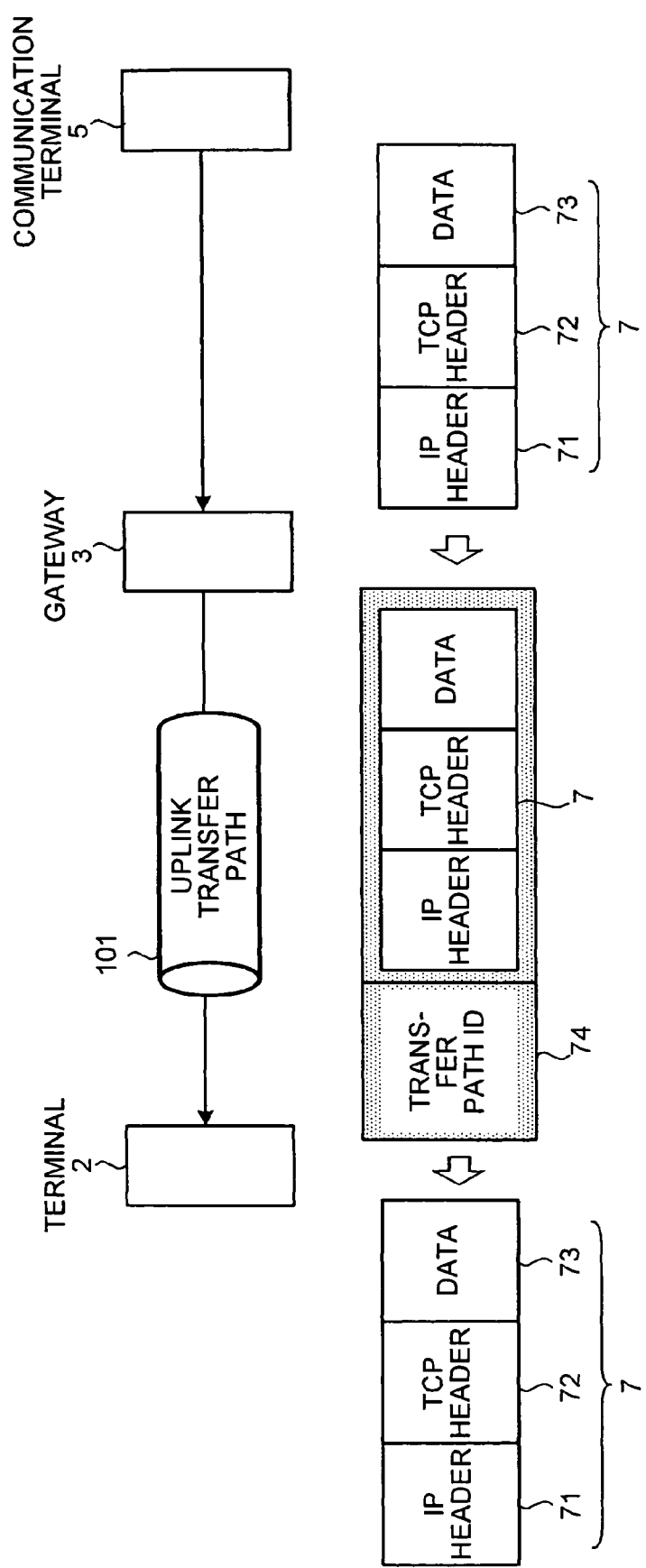
FIG. 4 is a schematic for illustrating a transition of packet formats in uplink transfer in the network system according to the embodiments.

FIG. 4 is a schematic for illustrating a transition of packet formats in uplink transfer in the network system. In the uplink transfer, a transfer path ID 74 to identify the uplink transfer path 101 is added, in the gateway 3, to a packet 7 including an IP header 71, a TCP header 72, and data 73. The transfer path ID 74 is deleted in the terminal 2. The IP header 71 has the global address of the communication terminals 5 as an IP address of a transmission source, and the global address of the physical interface 32 as a transmission destination IP address.

Figure 5:
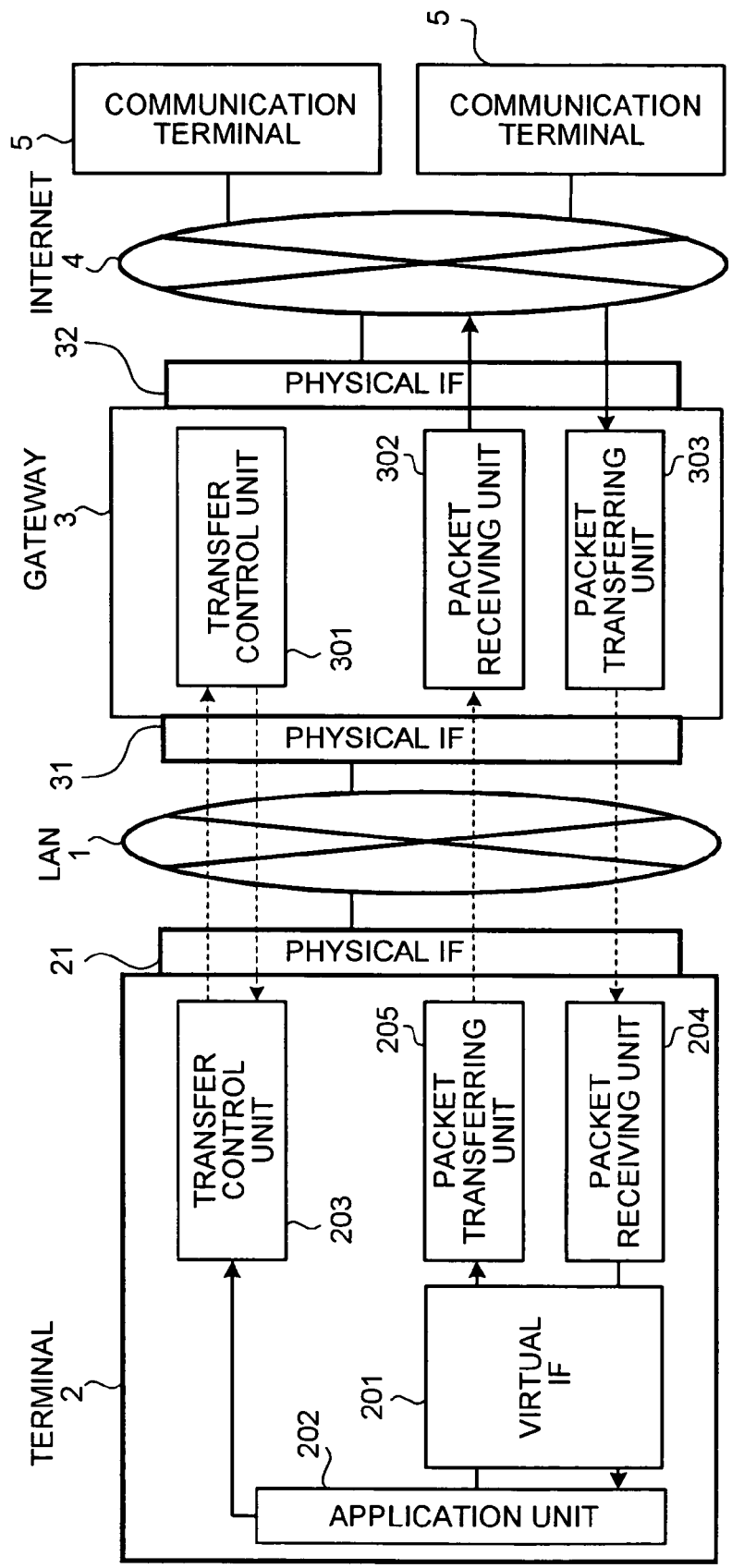
FIG. 5 is a schematic of a network system according to a first embodiment of the present invention.

FIG. 5 is a schematic of a network system according to a first embodiment of the present invention. As shown in FIG. 5, the terminal 2 in a private network includes a physical interface 21, a virtual interface 201, an application unit 202, a transfer control unit 203, a packet receiving unit 204, and a packet transferring unit 205.

When the transfer control unit 203 has detected that the application unit 202 has opened a communication port thereof for the virtual interface 201, the unit 203 transmits a transfer path setting request to the gateway 3. This transfer path setting request includes an ID of an uplink transfer path (hereinafter, "uplink transfer path ID"). The transfer path setting request may include a communication port number in addition to the uplink transfer path ID. The transfer control unit 203 receives a transfer path setting response sent from the gateway 3 in response to the transfer path setting request. The transfer control unit 203 acquires an ID of a downlink transfer path (hereinafter, "downlink transfer path ID") from the received transfer path setting response, and sets a corresponding downlink transfer path 102 (see FIG. 1).

The packet receiving unit 204 receives a packet transferred from the gateway through an uplink transfer path 101 (see FIG. 1), and delivers the packet to the application unit 202 through the virtual interface 201. The packet transferring unit 205 receives the packet transmitted from the application unit 202 to the virtual interface 201, and transfers the packet to the gateway 3 through the downlink transfer path 102 (see FIG. 1).

The gateway 3 includes a physical interface 31 on a LAN side, a physical interface 32 on an Internet side, a transfer control unit 301, a packet receiving unit 302, and a packet transferring unit 303. The physical interface 31 and the physical interface 32 are as described above. The transfer control unit 301 receives the transfer path setting request sent from the terminal 2 in the private network, and acquires the uplink transfer path ID from this transfer path setting request. The transfer control unit 301 sets the uplink transfer path 101 (see FIG. 1) corresponding to the acquired uplink transfer path ID, and transmits the transfer path setting response to the terminal 2. This transfer path setting response includes a downlink transfer path ID.

The packet transferring unit 303 receives the packet from the communication terminal 5 on the Internet 4, and transfers the packet to the terminal 2 in the private network through the uplink transfer path 101 (see FIG. 1). The packet receiving unit 302 receives the packet transferred from the terminal 2 through the downlink transfer path 102 (see FIG. 1), and transmits the packet to the Internet 4. The uplink transfer path 101 in the configuration shown in FIG. 1 is set between the packet transferring unit 303 of the gateway 3 and the packet receiving unit 204 of the terminal 2. The downlink transfer path 102 in the configuration shown in FIG. 1 is set between the packet transferring unit 205 of the terminal 2 and the packet receiving unit 302 of the gateway 3.

A procedure from the creation of the virtual interface 201 to the setting of the transfer paths will be described. An administrator creates the virtual interface 201 corresponding to the physical interface 32 of the gateway 3, in the terminal 2 using a command. When the application unit 202 of the terminal 2 has opened the communication port to the virtual interface 201, the transfer control unit 203 of the terminal 2 determines the uplink transfer path ID and transmits the ID to the gateway 3 as the transfer path setting request.

The transfer control unit 301 of the gateway 3 receives the transfer path setting request from the terminal 2, acquires the uplink transfer path ID from the transfer path setting request, and sets the uplink transfer path 101 (see FIG. 1). The transfer control unit 301 of the gateway 3 determines the downlink transfer path ID and transmits the ID to the terminal 2 as a transfer path setting response. The transfer control unit 203 of the terminal 2 receives the transfer path setting request from the gateway 3, acquires the downlink transfer path ID from the transfer path setting response, and sets the downlink transfer path 102 (see FIG. 1).

When the gateway 3 has received the packet from the communication terminal 5, the packet transferring unit 303 of the gateway 3 transmits the received packet to the terminal 2 through the uplink transfer path 101 (see FIG. 1). When the packet receiving unit 204 of the terminal 2 has received the packet through the uplink transfer path 101 (see FIG. 1), the unit 204 delivers the packet to the application unit 202 through the virtual interface 201.

When the application unit 202 of the terminal 2 has transmitted the packet to the virtual interface 201, the packet transferring unit 205 of the terminal 2 transfers the packet to the gateway 3 through the downlink transfer path 102 (see FIG. 1). When the packet receiving unit 302 of the gateway 3 has received the packet through the downlink transfer path 102 (see FIG. 1), the unit 302 transmits the packet to the communication terminal 5 on the Internet 4.

Figure 6:
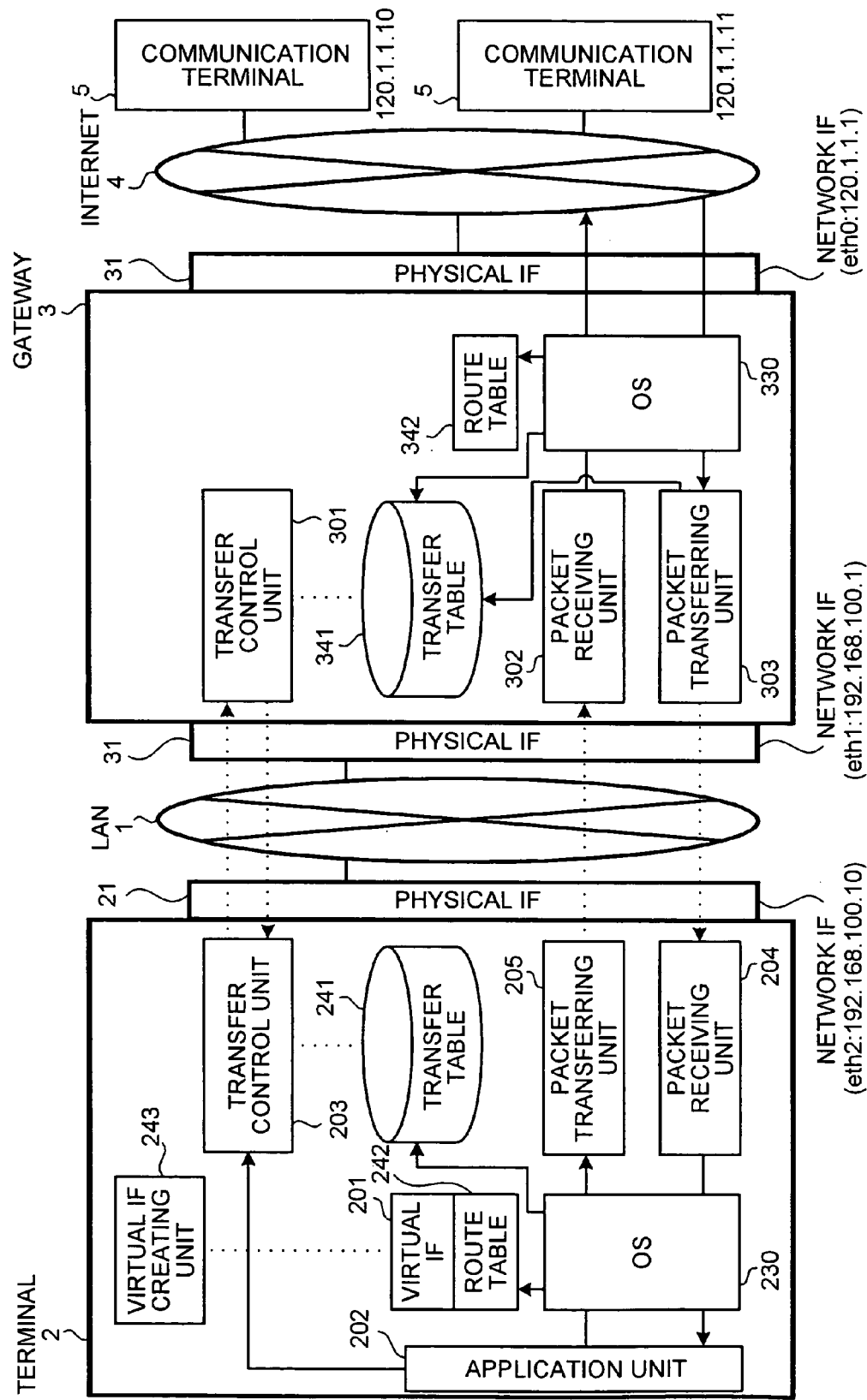
FIG. 6 is a schematic for illustrating detailed configuration of the network system according to the first embodiment.

FIG. 6 is a schematic for illustrating detailed configuration of the network system according to the first embodiment. As shown in FIG. 6, the terminal 2 in the private network includes the physical interface 21, the virtual interface 201, the application unit 202, the transfer control unit 203, the packet receiving unit 204, the packet transferring unit 205, an operating system (hereinafter, "OS") 230, a transfer table 241, a route table 242, and a virtual IF creating unit 243. The physical interface 21, the virtual interface 201, and the application unit 202 are as described above.

The transfer control unit 203, the packet receiving unit 204, and the packet transferring unit 205 of the terminal 2 are as described above. However, the contents to be added or changed will be described for the configuration of the terminal 2 to be more specific. The transfer control unit 203 of the terminal 2 detects from the application unit 202 that the application unit 202 has opened the communication port thereof and has accessed the virtual interface 201, and transmits the transfer path setting request to the gateway 3. This transfer path setting request includes the IP address of the terminal 2 as the uplink transfer path ID. The transfer path setting request may include the communication port number used by the application unit 202 in addition to the IP address.

The transfer control unit 203 of the terminal 2 receives the transfer path setting response from the gateway 3, and registers the IP address of the gateway 3 as the downlink transfer path ID into the transfer table 241. When the transfer path setting response includes the communication port number used by the application unit 202, the transfer control unit 203 may also register the communication port number into the transfer table 241. The packet receiving unit 204 receives the packet transferred from the gateway 3, and delivers the packet to the OS 230. The packet transferring unit 205 receives the packet from the OS 230, and transmits the packet from an interface specified by the OS 230.

The OS 230 executes transmission processing according to the specifications of TCP/IP to the packet sent from the application unit 202, and determines a destination interface to output the packet to. When the destination interface is the virtual interface 201, the OS 230 acquires the IP address of the gateway 3 from the transfer table 241, and executes processing corresponding to the IP layer (encapsulation by an IP header) according to the specification of TCP/IP to the packet to be output. The OS 230 determines the destination interface referring to the route table 242, and delivers the packet for which the processing corresponding to the IP layer has been completed, to the packet transferring unit 205.

The OS 230 receives the packet from the packet receiving unit 204, and judges whether the packet is addressed to the terminal 2 itself, referring to the route table 242. When the packet is addressed to the terminal 2 itself, the OS 230 executes encapsulation to the packet, executes reception processing according to the specifications of TCP/IP to the packet, and delivers the packet for which the reception processing has been completed, to the application unit 202. The virtual interface creating unit 243 creates the virtual interface 201 in the terminal 2, correlating the virtual interface 201 with the physical interface 32 of the gateway 3.

The transfer table 241 administers the IP address of the gateway 3 that is the destination of the packet. When the communication port number used by the application unit 202 is registered into the transfer table 241, the transfer table 241 administers the communication port number correlating the communication port number with the destination address. The route table 242 retains information for determining reception and transfer of the packet, and information for determining information on an interface to be output to for transfer. As such pieces of information, for example, IP addresses, network interface names, etc., can be listed.

As shown in FIG. 6, the gateway 3 includes the physical interface 31, the physical interface 32, the transfer control unit 301, the packet receiving unit 302, the packet transferring unit 303, an OS 330, a transfer table 341, and a route table 342. The physical interface 31 and the physical interface 32 are as above.

The transfer control unit 301, the packet receiving unit 302, and the packet transferring unit 303 of the gateway 3 are basically as described above. However, the contents to be added or changed will be described for the configuration of the gateway 3 to be more specific. The transfer control unit 301 of the gateway 3 receives the transfer path setting request from the terminal 2 in the private network, and registers the IP address of the terminal 2 into the transfer table 341 of the gateway 3. At this time, when this transfer path setting request includes the communication port number used by the application unit 202, the transfer control unit 301 may also register the communication pot number into the transfer table 341.

The transfer control unit 301 transmits the transfer path setting response to the terminal 2. This transfer path setting response contains the IP address of the gateway 3. The transfer path setting response may contain a communication port number used by the application unit 202 in addition to the IP address. The packet receiving unit 302 receives the packet transferred from the terminal 2, and delivers the packet to the OS 330. The packet transferring unit 303 receives the packet from the OS 330, and transmits the packet from an interface specified by the OS 330.

The OS 330 receives the packet from the communication terminal 5 on the Internet 4, and judges whether the packet is addressed to the gateway 3 itself, referring to the route table 342 of the gateway 3. When the packet is addressed to the gateway 3 itself, the OS 330 acquires the IP address of the terminal 2 from the transfer table 341 of the gateway 3. The OS 330 executes processing corresponding to the IP layer (encapsulation by an IP header) according to the specification of TCP/IP using the acquired IP address of the terminal 2. The OS 330 determines the destination interface referring to the route table 342, and delivers the packet for which the processing corresponding to the IP layer has been completed, to the packet transferring unit 303.

The OS 330 receives the packet from the packet receiving unit 302, and judges whether the packet is addressed to the gateway 3 itself, referring to the route table 342. When the packet is addressed to the gateway 3 itself, the OS 330 executes encapsulation to the packet, executes relay processing according to the specifications of TCP/IP to the packet, and transmits again the packet for which the relay processing has been completed, from the physical interface 31.

The transfer table 341 administers the IP address of the terminal 2 that is the destination of the packet. When the communication port number used by the application unit 202 is registered into the transfer table 341, the transfer table 341 administers the communication port number correlating the communication port number with the destination address. The route table 342 retains information for determining reception and transfer of the packet and information for determining information on an interface to be output to for transfer. As such pieces of information, for example, IP addresses, network interface names, etc., can be listed.

For convenience of description, hereinafter, for the terminal 2, the IP address and the name of the virtual interface 201 thereof will be respectively represented as [120.1.1.1] and "vif0", and the IP address and the name of the physical interface 21 thereof will be respectively represented as [192.168.100.10] and "eth2". Similarly, for the gateway 3, the IP address and the name of the physical interface 31 thereof will be respectively represented as [192.168.100.1] and "eth1", and the IP address and the name of the physical interface 32 thereof will be respectively represented as [120.1.1.1] and "eth0". Two IP addresses of the communication terminals 5 of the Internet 4 will be represented as [120.1.1.10] and [120.1.1.11]. However, the number of the communication terminal 5 connected with the Internet 4 is not limited to two.

FIG. 7, FIG. 8, FIG. 9, and FIG. 10 respectively illustrate the transfer table 241 of the terminal 2, the route table 242 of the terminal 2, the transfer table 341 of the gateway 3, and the route table 342 of the gateway 3 for the case where the above IP addresses are respectively assigned to each of the interfaces. As shown in FIG. 7, the transfer table 241 of the terminal 2 stores [192.168.100.1] as a transfer destination address. As shown in FIG. 8, the route table 242 of the terminal 2 stores information indicating that the name of the interface to be output to, corresponding to the destination address, [192.168.100.0/24] is eth2; that the name of the interface to be output to, corresponding to the destination address, [120.1.1.0/24] is vif0; and that no interface to be output to, corresponding to the destination address, [192.168.100.10] is present.

As shown in FIG. 9, the transfer table 341 of the gateway 3 stores [192.168.100.10] as a transfer destination address. As shown in FIG. 10, the route table 342 of the gateway 3 stores information indicating that the name of the interface to be output to corresponding to the destination address, [192.168.100.0/24] is eth1; that the name of the interface to be output to corresponding to the destination address, [120.1.1.0/24] is eth0; and that no interface to be output to corresponding to the destination address, [192.168.100.1] is present.

Figure 11:
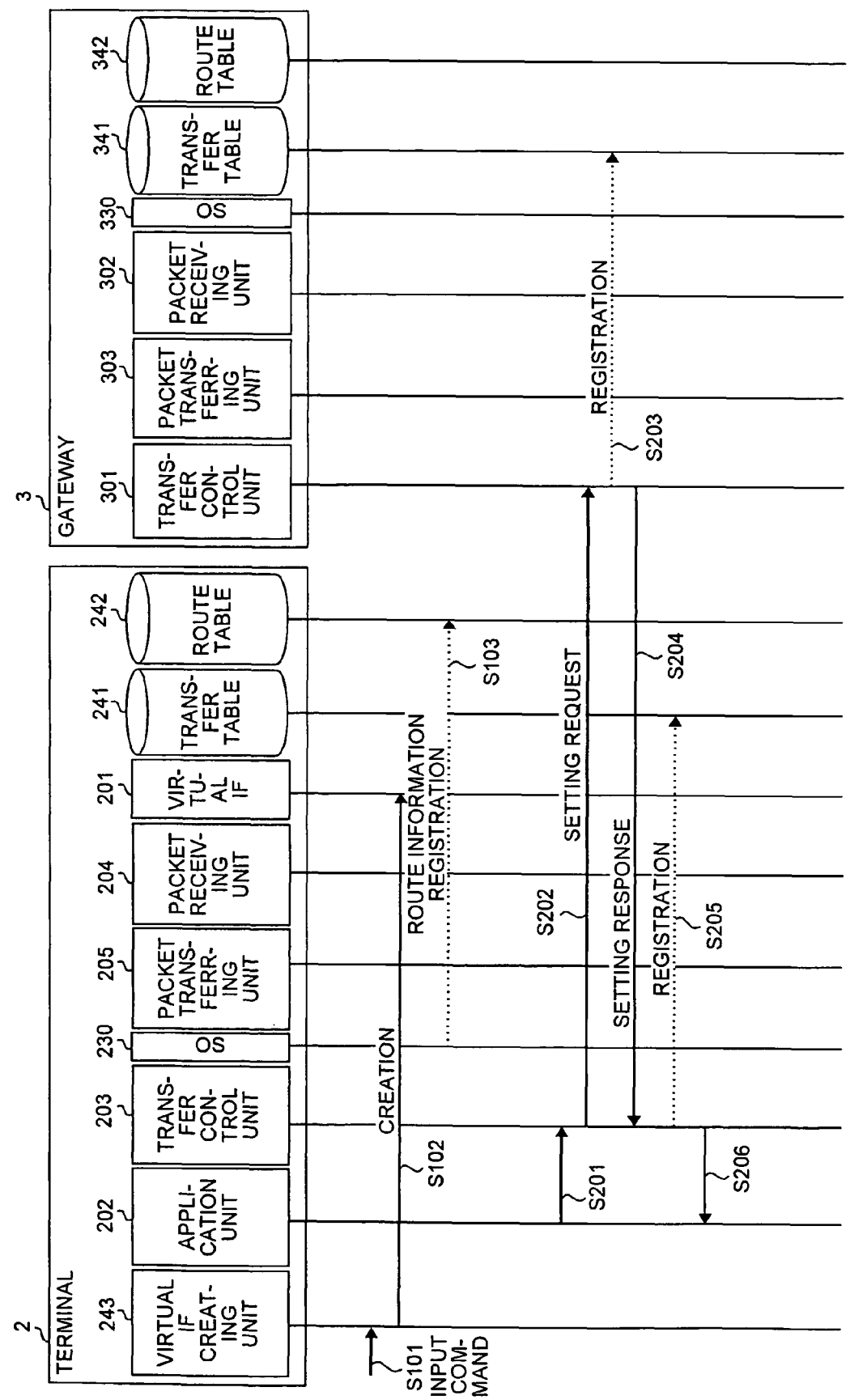
FIG. 11 is a schematic for illustrating a process sequence from creation of a virtual interface to setting of transfer paths.

A procedure for executing settings necessary for the application unit 202 of the terminal 2 to communicate with the communication terminal 5 on the Internet 4 will be described. FIG. 11 is a schematic for illustrating the processing sequence from the creation of the virtual interface to the setting of the transfer paths.

The administrator instructs to create the virtual interface 201 that corresponds to the physical interface 32 of the gateway 3, to the virtual interface creating unit 243 of the terminal 2 using a operation command (step S101). More specifically, the administrator inputs the IP address, [120.1.1.1] of the physical interface 32 (name: eth0) and the name, vif0 of the virtual interface of the gateway 3.

Thereby, the virtual interface creating unit 243 creates the virtual interface 201 that has the IP address, [120.1.1.1] and the name, vif0, in the terminal 2 (step S102). At this point, the OS 230 of the terminal 2 registers route information (destination address: [120.1.1.0/24], the interface to be output to: vif0, see FIG. 8) for the virtual interface 201, into the route table 242 (step S103).

The application unit 202 of the terminal 2 requests to open a communication port to communicate. When the application unit 202 has opened a communication port to the virtual interface 201, the request to open is notified to the transfer control unit 203 of the terminal 2 through the OS 230 (step S201). The transfer control unit 203 transmits the IP address, [192.168.100.10] of the physical interface 21 (name: eth2) of the terminal 2 as a transfer path setting request, to the gateway 3 (step S202). The IP address of this eth2 is used in the capsulation for transferring a packet from the physical interface to the virtual interface 201.

When the transfer control unit 301 of the gateway 3 has received the transfer path setting request from the terminal 2, the unit 301 acquires the IP address, [192.168.100.10] of the terminal 2 from the transfer path setting request, and registers the IP address into the transfer table 341 of the gateway 3 as the transfer destination address (step S203). The transfer control unit 301 transmits the IP address, [192.168.100.1] of the physical interface 31 (name: eth1) of the gateway 3 to the terminal 2, as the transfer path setting response (step S204). The IP address of this eth1 is used in the capsulation for transferring the packet from the virtual interface 201 to the physical interface.

When the transfer control unit 203 of the terminal 2 has received the transfer path setting response from the gateway 3, the unit 203 acquires the IP address, [192.168.100.1] of the gateway 3 from the transfer path setting response, and registers the IP address into the transfer table 241 of the terminal 2 as the transfer destination address (step S205). The transfer control unit 203 notifies the application unit 202 of the communication port opening response through the OS 230 (step S206), and the series of setting process steps in this sequence are ended.

Figure 12:
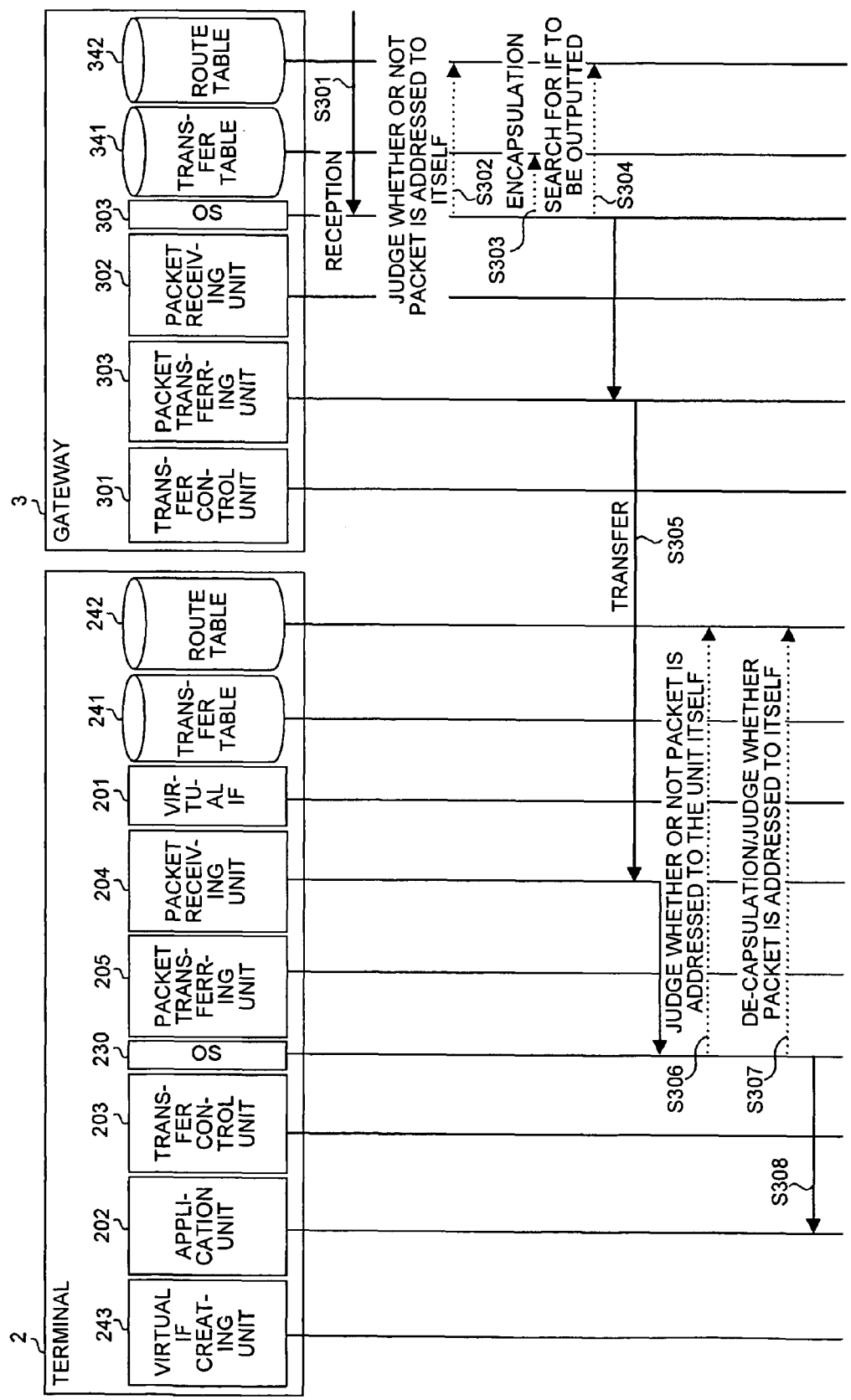
FIG. 12 is a schematic for illustrating a process sequence at the time of reception of a packet in the network system according to the first embodiment.
Figure 13:
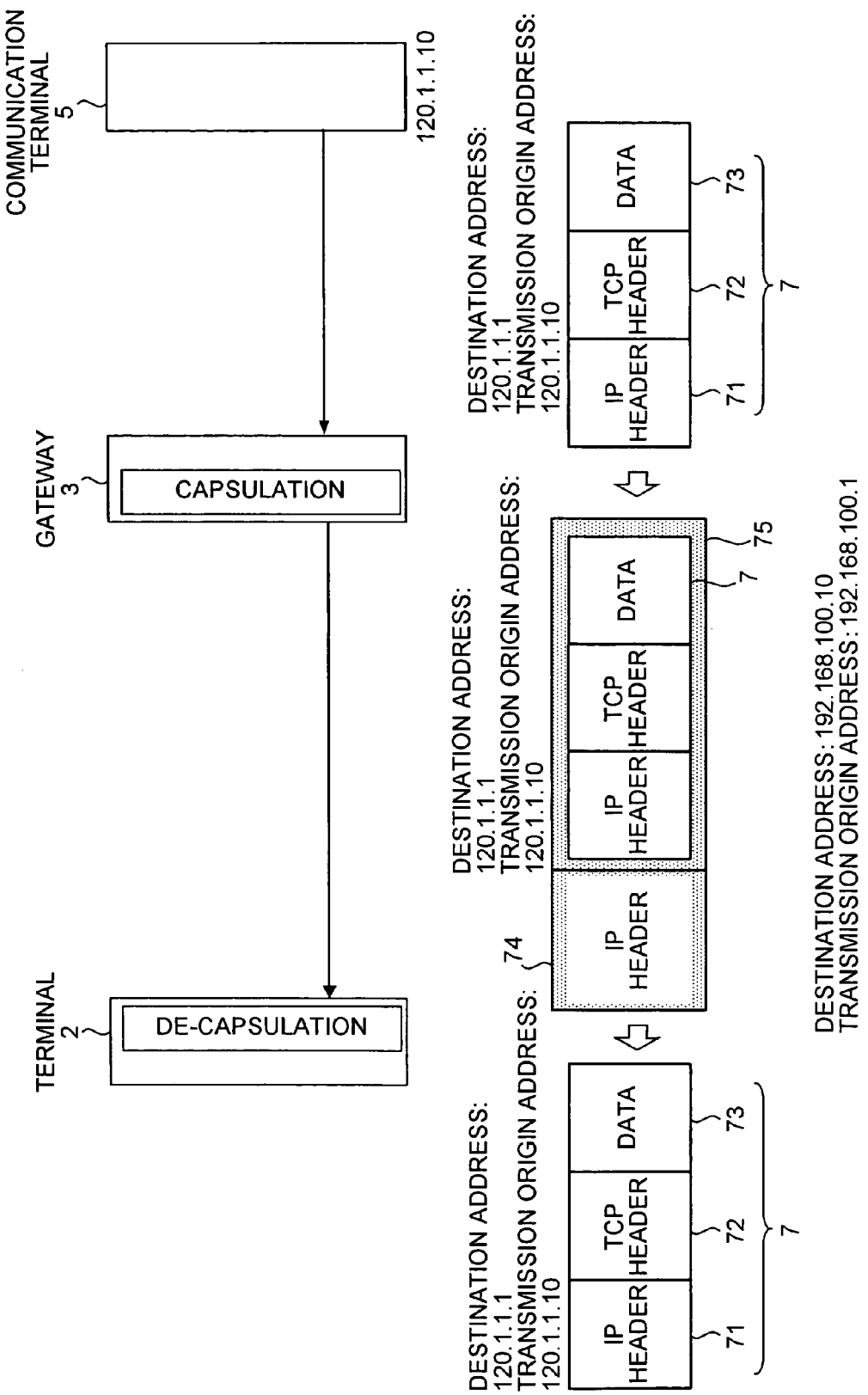
FIG. 13 is a schematic for illustrating a transition of packet formats at the time of reception of a packet in the network system according to the first embodiment.

FIG. 12 is a schematic for illustrating a process sequence at the time of reception of a packet, and FIG. 13 is a schematic for illustrating a transition of packet formats at the time of reception of a packet (in uplink transfer).

The gateway 3 receives the packet 7 with the destination address, [120.1.1.1], from the communication terminal 5 (IP address: [120.1.1.10]) on the Internet 4 (step S301). The OS 330 of the gateway 3 refers to the route table 342 of the gateway 3 using the destination address, [120.1.1.1] of the packet 7 as a key. No interface to be output to is present at the destination address, [120.1.1.1] of the route table 342 (see FIG. 10). Therefore, the OS 330 judges that the received packet is addressed to the gateway 3 itself (step S302).

The OS 330 acquires the IP address, [192.168.100.10] of the terminal 2 as a transfer destination address, from the transfer table 341 of the gateway 3 (see FIG. 9), and encapsulates the packet 7 using the IP header (transfer path ID 74) for which the IP address, [192.168.100.10] of the terminal 2 is set as the destination address (step S303). The OS 330 refers to the route table 342 using the destination address, [192.168.100.10] of a packet 75 that has been capsulated, as a key, and retrieves the interface to be output to.

For the destination address, [192.168.100.0/24] in the route table 342, the physical interface 31 (name: eth1) of the gateway 3 is listed as an interface to be output to (see FIG. 10). Therefore, the OS 330 determines eth1 to be the interface to be output to (step S304). The OS 330 transmits the encapsulated packet 75 from eth1 through the packet transferring unit 303 to the terminal 2 (step S305).

When the packet receiving unit 204 of the terminal 2 has received the encapsulated packet 75 (destination address: [192.168.100.10]) from the gateway 3, the unit 204 delivers the packet 75 to the OS 230 of the terminal 2. The OS 230 refers to the route table 242 of the terminal 2 using the destination address, [192.168.100.10] of the encapsulated packet 75, as a key. For the destination address, [192.168.100.10], no interface to be output to is listed (see FIG. 8). Therefore, the OS 230 determines that the received packet 75 is addressed to the terminal 2 itself (step S306).

The OS 230 deletes the IP header (transfer path ID 74) for encapsulation from the encapsulated packet 75 (de-capsulation). The OS 230 searches in the route table 242 using the destination address, [120.1.1.1] of the original packet 7 as a key. For the destination address, [120.1.1.0/24] in the route table 242, the virtual interface 201 (name: vif0) of the terminal 2 is listed as an interface to be output to (see FIG. 8). Therefore, the OS 230 judges that the packet 7 is addressed to the terminal 2 itself (step S307). The OS 230 identifies an application that communicates, from the communication port number contained in the TCP header 72 of the packet 7 and delivers the packet 7 to the application unit 202 (step S308), and the series of data reception process steps in this sequence are ended.

Figure 14:
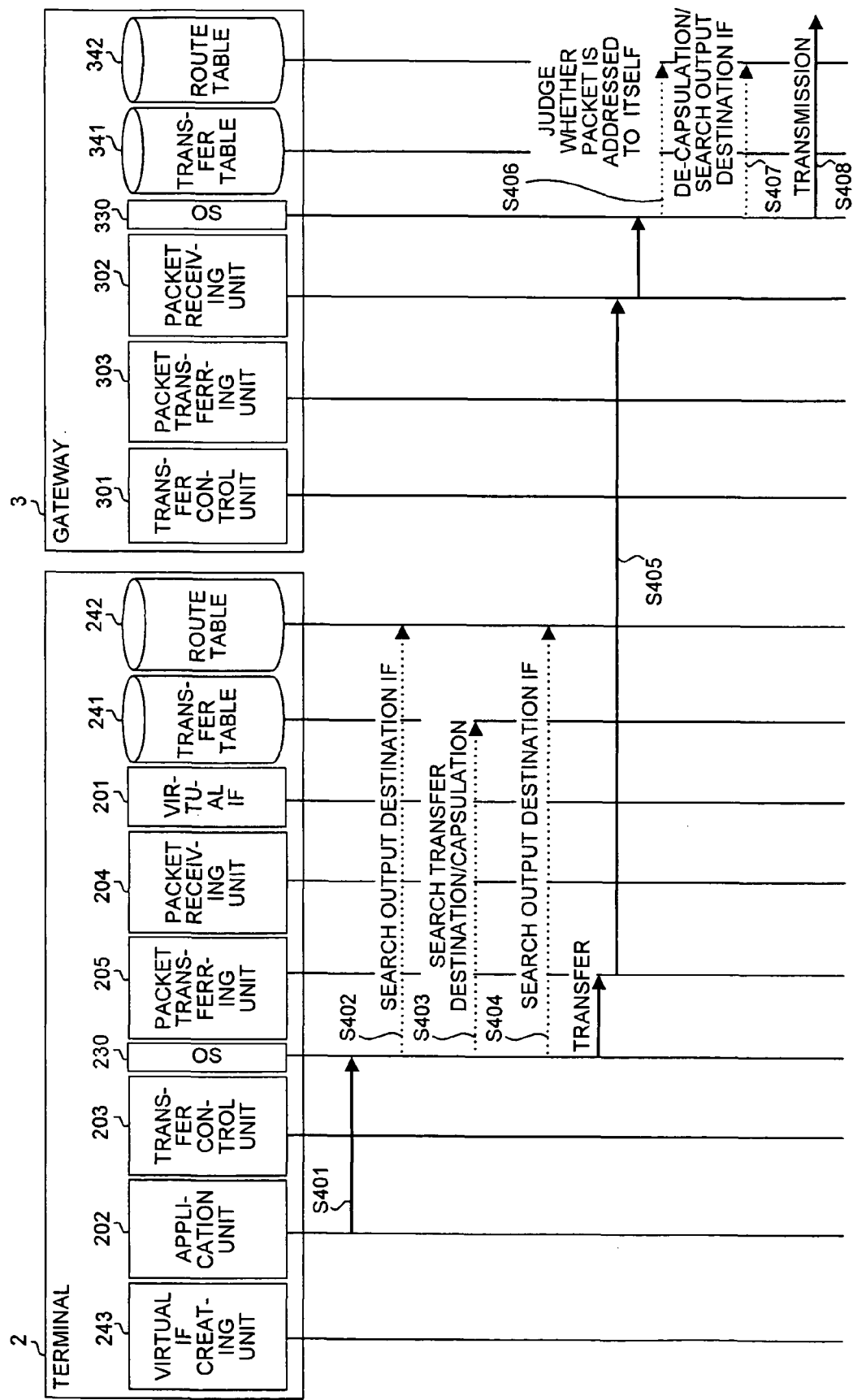
FIG. 14 is a schematic for illustrating a process sequence at the time of transmission of a packet in the network system according to the first embodiment.
Figure 15:
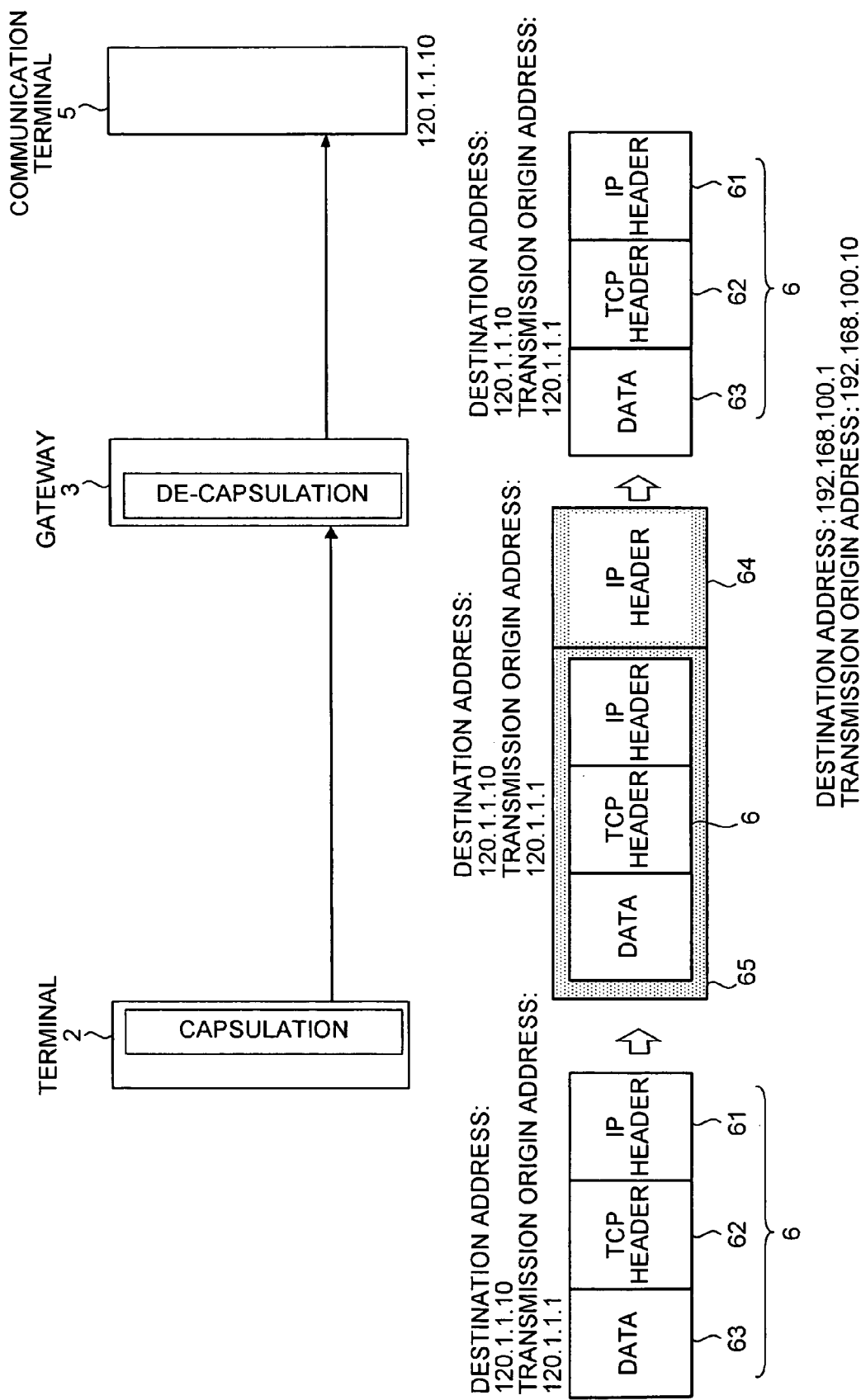
FIG. 15 is a schematic for illustrating a transition of packet formats at the time of transmission of a packet in the network system according to the first embodiment.

FIG. 14 is a schematic for illustrating a process sequence at the time of transmission of a packet, and FIG. 15 is a schematic for illustrating a transition of packet formats at the time of transmission of a packet (in downlink transfer).

When the application unit 202 of the terminal 2 has transmitted the packet 6 addressing to the communication terminal 5 (IP address: [120.1.1.10]) on the Internet 4, the OS 230 of the terminal 2 receives the packet 6 (step S401). The OS 230 refers to the route table 242 using the destination address [120.1.1.10] of the packet 6 as a key, and retrieves an interface to be output to (step S402).

For the destination address, [120.1.1.0/24] of the route table 242, the virtual interface 201 (name: vif0) of the terminal 2 is listed to be the interface to be output to (see FIG. 8). Therefore, the OS 230 acquires vif0 that is the interface to be output to (step S402). Because the interface to be output to is the virtual interface 201, the OS 230 acquires the IP address, [192.168.100.1] of the physical interface 31 of the gateway 3 as the transfer destination address from the transfer table 241 (see FIG. 7), and encapsulates the packet 6 using the IP header (transfer path ID 64) for which this IP address, [192.168.100.1] is set as the destination address (step S403).

The OS 230 refers to the route table 242 using the destination address, [192.168.100.1] of a packet 65 that has been capsulated, as a key, and retrieves the interface to be output to. For the destination address, [192.168.100.0/24] in the route table 242, the physical interface 31 (name: eth2) of the terminal 2 is listed as an interface to be output to (see FIG. 8). Therefore, the OS 230 determines eth2 to be the interface to be output to (step S404). The OS 230 transfers the encapsulated packet 65 from eth2 through the packet transferring unit 205 to the gateway 3 (step S405).

When the packet receiving unit 302 of the gateway 3 has received the encapsulated packet 65 (destination address: [192.168.100.1]) from the terminal 2, the unit 302 delivers the packet 65 to the OS 330 of the gateway 3. The OS 330 refers to the route table 342 using the destination address, [192.168.100.1] of the encapsulated packet 65, as a key. For the destination address, [192.168.100.1] in the route table 342, no interface to be output to is listed (see FIG. 10). Therefore, the OS 330 determines that the received packet 65 is addressed to the gateway 3 itself (step S406).

The OS 330 deletes the IP header (transfer path ID 64) for encapsulation from the encapsulated packet 65 (de-capsulation). The OS 330 searches in the route table 342 using the destination address, [120.1.1.10] of the original packet 6, as a key. For the destination address, [120.1.1.0/24] in the route table 342, the physical interface 32 (name: eth0) of the gateway is listed as an interface to be output to (see FIG. 10). Therefore, the OS 330 determines eth0 to be the interface to be output to (step S407). The OS 330 transmits the de-capsulated packet 6 from eth0 to the communication terminal 5 (IP address: [120.1.1.10]) on the Internet 4 (step S408), and the series of data transmission process steps in this sequence are ended.

Figure 16:
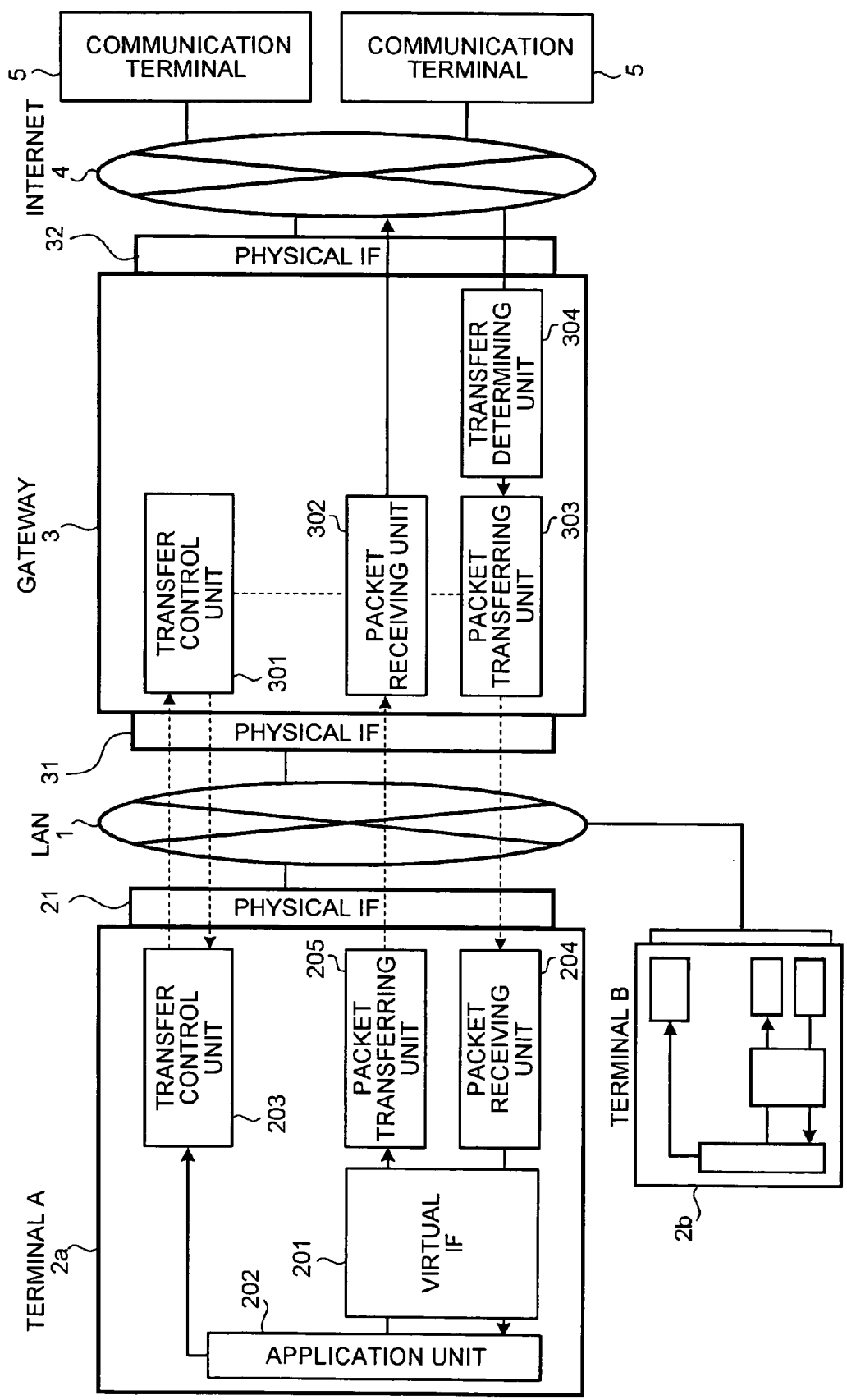
FIG. 16 is a schematic of a network according to a second embodiment of the present invention.

FIG. 16 is a schematic of the network system according to the second embodiment. As shown in FIG. 16, the second embodiment is an example for the case where a plurality (two in the example shown) of terminals are provided in the private network in the configuration of FIG. 5. For convenience of description, the reference symbol for one terminal A is "2a" and the reference symbol for the other terminal B is "2b". In the second embodiment, in the two terminals, the configuration and the operation will be described for the terminal A2a. However, the same description can be applied to the terminal B2b.

Only the points that differ from the contents of the first embodiment above will be described below. The transfer path setting request to be transmitted from the transfer control unit 203 of the terminal A2a to the gateway 3, includes a communication port number used by the application unit 202 of the terminal A2a in addition to the uplink transfer path ID.

For the gateway 3, a transfer destination determining unit 304 is added to the configuration of FIG. 5. The transfer destination determining unit 304 receives a packet from the communication terminal 5 on the Internet 4, and determines the terminal A2a of the transfer destination based on the communication port number of the packet. The transfer destination determining unit 304 delivers the packet to be transferred to the packet transferring unit 303, correlating the transfer path ID forwarded to the terminal A2a that is the transfer destination with the packet.

The packet transferring unit 303 receives the packet and the transfer path ID from the transfer destination determining unit 304, and transfers the packet to the terminal A2a through a corresponding uplink transfer path. The transfer control unit 301 sets a corresponding uplink transfer path based on the uplink transfer path ID and the communication port number acquired from the transfer path setting request. The transfer path setting request contains the communication port number in addition to the downlink transfer path ID.

The transfer control unit 203 of the terminal A2*a* transmits an uplink transfer path ID and the communication port number as the transfer path setting request to the gateway 3. The transfer control unit 301 of the gateway 3 acquires the uplink transfer path ID and the communication port number from the transfer path setting request, and sets the uplink transfer path 101 correlating the path 101 with the communication port number (see FIG. 1). The transfer control unit 301 of the gateway 3 transmits a downlink transfer path ID and a communication port number as a transfer path setting response to the terminal A2*a*. The transfer control unit 203 of the terminal A2*a* acquires the downlink transfer path ID and the connection ID from the transfer path setting response, and sets the downlink transfer path 102 correlating the path 102 with the connection ID (see FIG. 1).

When the gateway 3 has received the packet from the communication terminal 5 on the Internet 4, the transfer destination determining unit 304 of the gateway 3 determines the terminal A2*a* that is the transfer destination based on the header information of the packet and the communication port number, and delivers the transfer path ID directed to the terminal A2*a* and the packet to the packet transferring unit 303 of the gateway 3. The packet transferring unit 303 transfers the packet to the terminal A2*a* through the uplink transfer path that corresponds to the transfer path ID.

Figure 17:
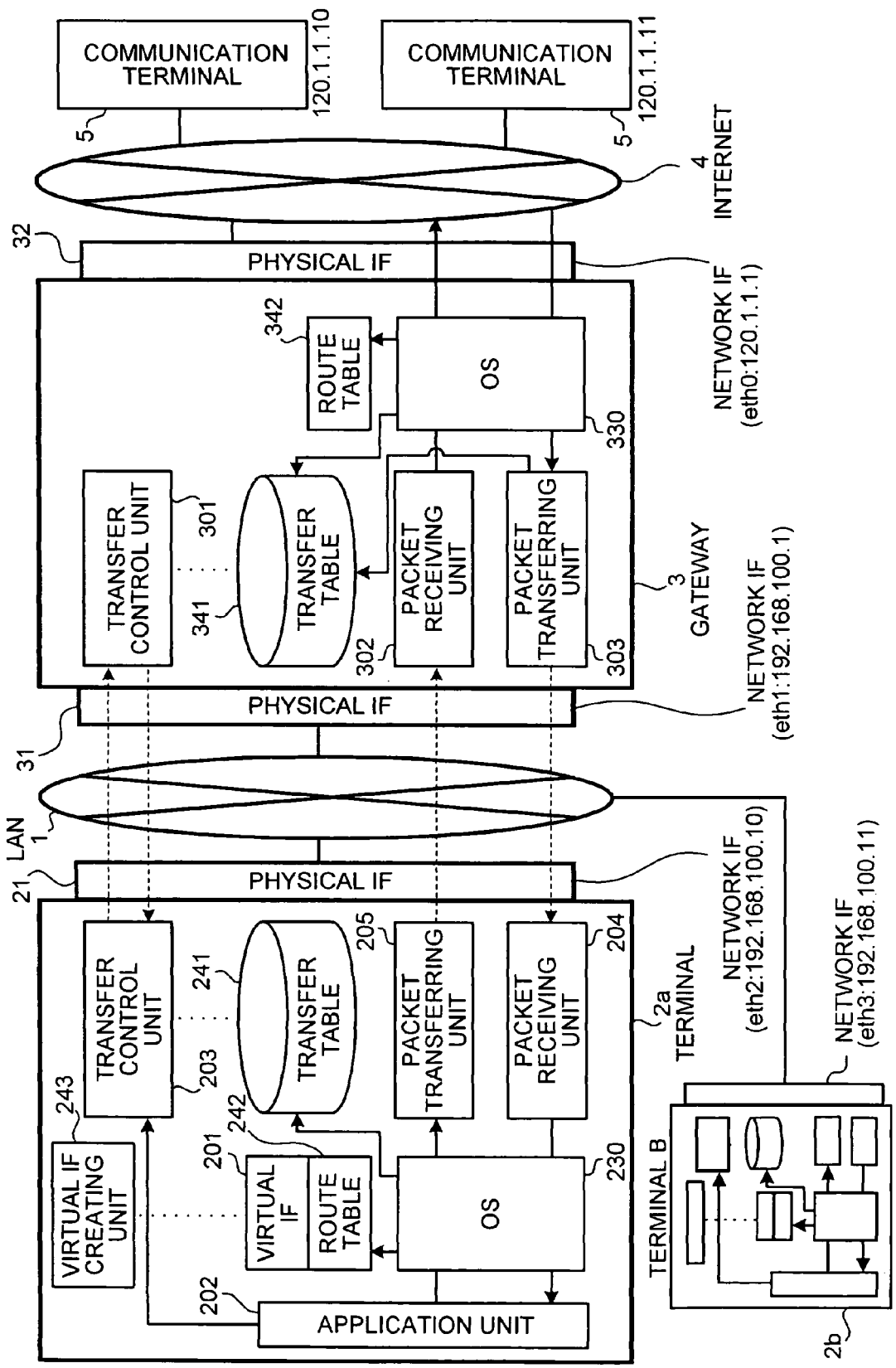
FIG. 17 is a schematic for illustrating detailed configuration of the network system according to the second embodiment.

FIG. 17 is a schematic for illustrating detailed configuration of the network according to the second embodiment. Only the points that differ from the first embodiment will be described below.

The transfer control unit 301 of the gateway 3 receives the transfer path setting request from the terminal A2*a* in the private network, and registers the IP address of the terminal A2*a* and the communication port number used by the application unit 202 into the transfer table 341 of the gateway 3. The transfer control unit 301 transmits the transfer path setting response containing the IP address and the communication port number of the gateway 3 to the terminal A2*a*.

When the OS 330 of the gateway 3 has received the packet addressed to the gateway 3 itself from the communication terminal 5 on the Internet 4, the OS 330 searches in the transfer table 341 of the gateway 3 using the destination port number of the packet as a key, and acquires the IP address of the terminal A2*a* that is the transfer destination. The transfer table 341 of the gateway 3 administers the IP address of the terminal A2*a* in the private network and the port number used for communication by the application unit 202. When the gateway 3 communicates with the terminal B2*b*, the transfer table 341 administers the IP address and the port number used for communication by the application unit 202 also for the terminal B2*b*.

For convenience of description, in the second embodiment, the IP address and name of the physical interface 21 and the port number used by the application unit 202 of the terminal A2*a* are respectively [192.168.100.10], eth2, and 2000. The IP address and name of the physical interface and the port number used by the application unit of the terminal B2*b* are respectively [192.168.100.11], eth3, and 5000. The number of the terminals in the private network is not limited to two.

Figure 18:
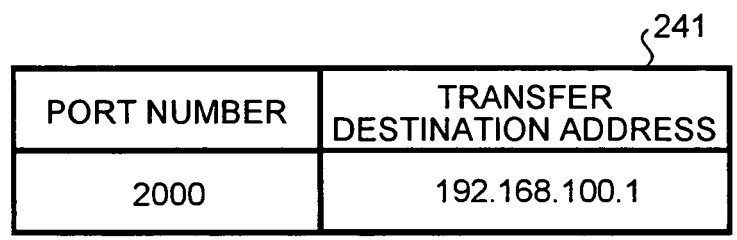
FIG. 18 is a schematic for illustrating a transfer table of a terminal according to the second embodiment.
Figure 19:
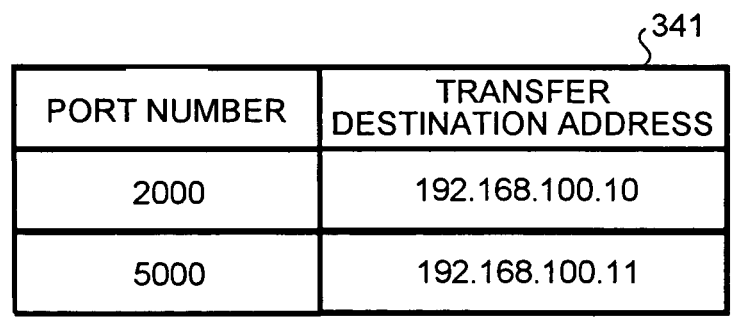
FIG. 19 is a schematic for illustrating a transfer table of a gateway according to the second embodiment.

FIG. 18 and FIG. 19 respectively illustrate an example of the transfer table 241 of the terminal A2*a*, and the transfer table 341 of the gateway 3. As shown in FIG. 18, the transfer table 241 of the terminal A2*a* stores the port number, 2000, and the transfer destination address, [192.168.100.1], corre-lating the port number with the address. As shown in FIG. 19, the transfer table 341 of the gateway 3 stores the port number, 2000, and the transfer destination address, [192.168.100.10], and the port number, 5000, and transfer destination address, [192.168.100.11], correlating respectively the port number with the address. The route table 242 of the terminal A2*a* and the route table 342 of the gateway 3 are respectively same as in FIG. 8 and FIG. 10.

The processing sequence of this setting procedure is as shown in FIG. 11. However, the terminal 2 is the terminal A2*a* in FIG. 11. At step S202 of FIG. 11, transfer control unit 203 of the terminal A2*a* transmits the IP address, [192.168.100.10] of the physical interface 21 (name: eth2) of the terminal A2*a* and the communication port number, 2000 used by the application unit 202 of the terminal A2*a* to the gateway 3 as a transfer path setting request.

At Step S203, the transfer control unit 301 of the gateway 3 acquires the IP address, [192.168.100.10] and the communication port number, 2000 of the terminal A2*a* from the transfer path setting request, and registers the IP address and the communication port number into the transfer table 341 of the gateway 3. At step S204, the transfer control unit 301 transmits the IP address, [192.168.100.1] and the communication port number, 2000 of the physical interface 31 (name: eth1) of the gateway 3 to the terminal A2*a* as a transfer path setting response.

At step S205, the transfer control unit 203 of the terminal A2*a* acquires the IP address, [192.168.100.1] and the communication port number, 2000 of the gateway 3 from the transfer path setting response, and registers the IP address and the communication port number into the transfer table 241 of the terminal A2*a*.

Figure 20:
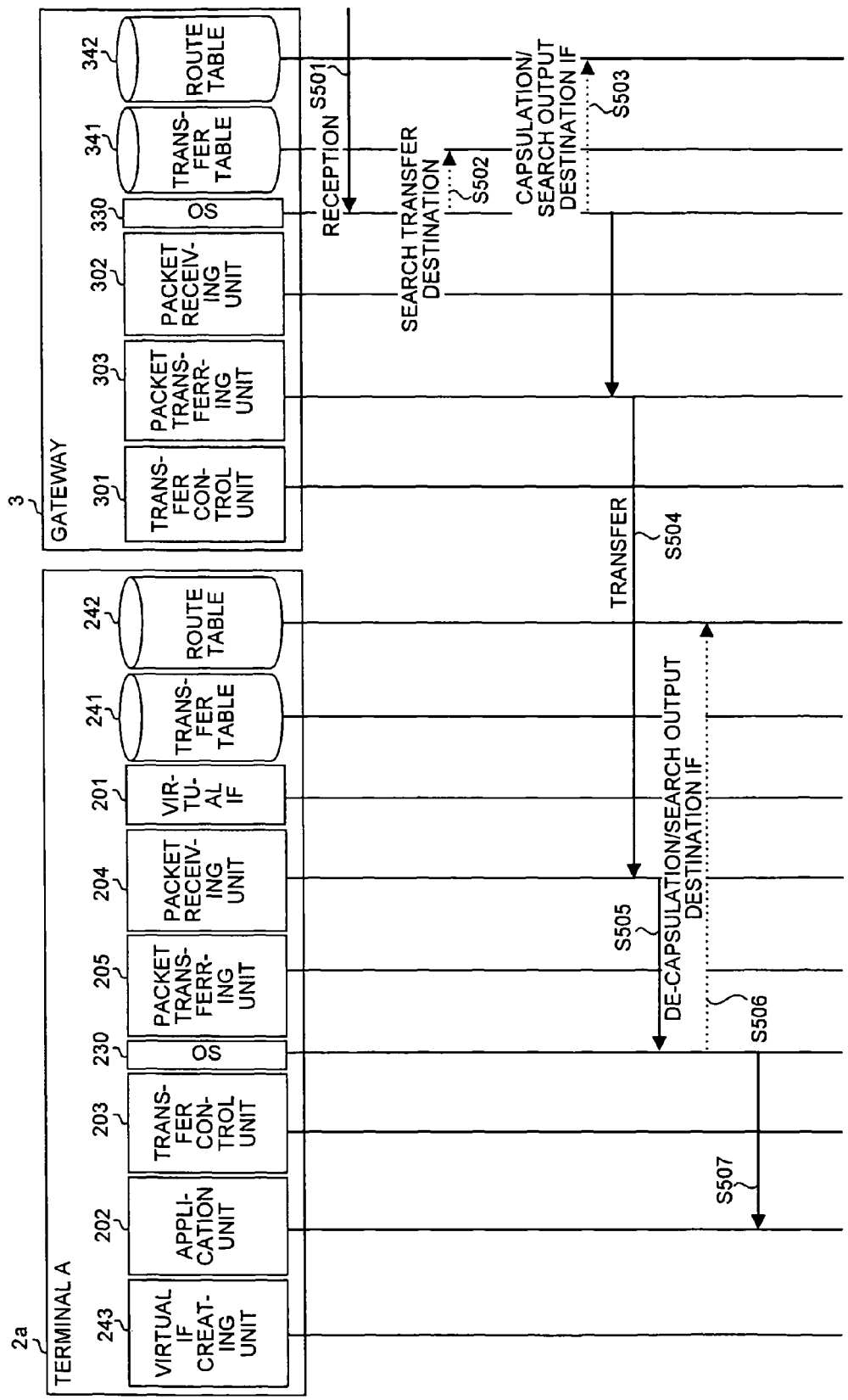
FIG. 20 is a schematic for illustrating a transition of packet formats at the time of reception of a packet in the network system according to the second embodiment.

FIG. 20 is a schematic for illustrating a transition of packet formats at the time of reception of a packet.

The gateway 3 receives a packet having the destination address, [120.1.1.1] and the communication port number, 2000 from the communication terminal 5 (IP address: [120.1.1.10] on the Internet 4 (step S501). The OS 330 of the gateway 3 refers to the route table 342 of the gateway 3 using the destination address, [120.1.1.1] of the packet, as a key. No interface to be output to is present at the destination address, [120.1.1.1] of the route table 342 (see FIG. 10). Therefore, the OS 330 determines that the received packet is addressed to the gateway 3 itself (step S302).

The OS 330 searches in the transfer table 341 of the gateway 3 using the destination port number, 2000 as a search key, and acquires the IP address, [192.168.100.10] of the terminal A2*a* as a transfer destination address (see FIG. 19, step S502). The OS 330 encapsulates the packet using the IP header for which the IP address, [192.168.100.10] of the terminal A2*a* is set as the destination address, refers to the route table 342 using the destination address, [192.168.100.10] of the packet as a key, and searches for the interface to be output to.

For the destination address, [192.168.100.0/24] in the route table 342, the physical interface 31 (name: eth1) of the gateway 3 is listed as an interface to be output to (see FIG. 10). Therefore, the OS 330 determines eth1 to be the interface to be output to (step S503). The OS 330 transfers the encapsulated packet from eth1 through the packet transferring unit 303 to the terminal A2*a* (step S504).

When the packet receiving unit 204 of the terminal A2*a* has received the encapsulated packet (destination address: [192.168.100.10]) from the gateway 3, the unit 204 delivers the packet to the OS 230 of the terminal A2*a* (step S505). The OS 230 refers to the route table 242 of the terminal A2*a* using the destination address, [192.168.100.10] of the encapsulated packet as a key. For the destination address,

[192.168.100.10], no interface to be output to is listed (see FIG. 8). Therefore, the OS 230 determines that the received packet 75 is addressed to the terminal 2 itself.

The OS 230 deletes the IP header for encapsulation from the encapsulated packet (de-capsulation). The OS 230 searches in the route table 242 using the destination address, [120.1.1.1] of the original packet as a key. For the destination address, [120.1.1.0/24] in the route table 242, the virtual interface 201 (name: vif0) of the terminal A2a is listed as an interface to be output to (see FIG. 8). Therefore, the OS 230 judges that the packet is addressed to the terminal 2 itself (step S506). The OS 230 identifies an application that communicates, from the communication port number, 2000 of the packet and delivers the packet to the application unit 202 (step S507), and the series of data reception process steps in this sequence are ended.

Figure 21:
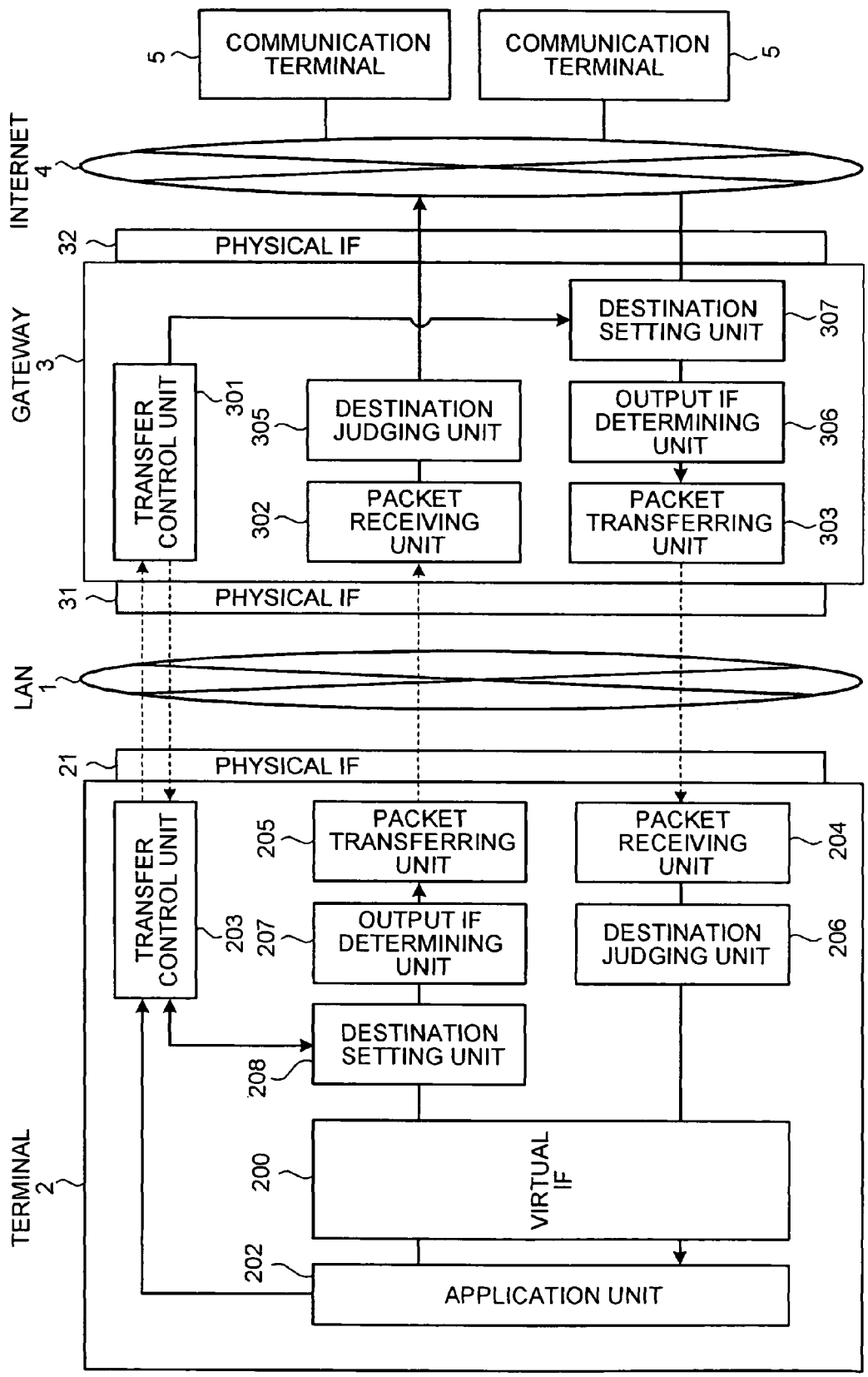
FIG. 21 is a schematic of a network system according to a third embodiment of the present invention.

FIG. 21 is a schematic of a network system according to a third embodiment of the present invention. As shown in FIG. 21, in the configuration of FIG. 5, the third embodiment is configured to have added a destination judging unit 206, an output interface determining unit 207, and an destination setting unit 208 to the terminal 2 as well as to have added a destination judging unit 305, an output interface determining unit 306, and a destination setting unit 307 to the gateway 3.

Only the points that differ from the contents of the first embodiment above will be described below. The configuration of the terminal 2 will be described. The destination judging unit 206 judges whether the received packet is addressed to the terminal 2 itself and, when the packet is addressed to the terminal 2 itself, deletes the header containing destination information from the packet. The output interface determining unit 207 determines the interface to be output to for the destination of the packet. The destination setting unit 208 gives a header containing destination information to the packet.

The configuration of the gateway 3 will be described. The destination judging unit 305 judges whether the received packet is addressed to the gateway 3 itself and, when the packet is addressed to the gateway 3 itself, deletes the header containing destination information from the packet. The output interface determining unit 306 determines the interface to be output to for the destination of the packet. The destination setting unit 307 gives a header containing destination information to the packet.

Only the points that differ from the contents of the first embodiment above will be described below. When a communication port for the virtual interface 201 is opened, the transfer control unit 203 of the terminal 2 transmits destination information for delivering the packet to the terminal 2, to the gateway 3 as a transfer path setting request. The transfer control unit 301 of the gateway 3 acquires the destination information for delivering the packet to the terminal 2, from the transfer path setting request, and delivers the destination information to the destination setting unit 307 of the gateway 3.

The transfer control unit 301 of the gateway 3 transmits the destination information for delivering the packet to the gateway 3, to the terminal 2 as a transfer path setting response. The transfer control unit 203 of the terminal 2 acquires the destination information for delivering the packet to the gateway 3, from the transfer path setting response, and delivers the destination information to the destination setting unit 208 of the terminal 2.

When the gateway 3 has received the packet from the communication terminal 5 on the Internet 4, the destination setting unit 307 of the gateway 3 captures the packet as data, gives the packet a header containing the destination information to the terminal 2, and delivers the header-attached packet to the output interface determining unit 306 of the gateway 3. The output interface determining unit 306 determines the interface to be output to, from the destination information of the header given to the packet, and notifies the packet transferring unit 303 of the gateway 3, of the interface to be output to. The packet transferring unit 303 transmits the packet using the interface that has been notified of from the output interface determining unit 306.

When the packet receiving unit 204 of the terminal 2 has received the packet from the gateway 3, the unit 204 delivers the packet to the destination judging unit 206 of the terminal 2. The destination judging unit 206 judges whether the packet is addressed to the terminal 2 itself from the destination information of the packet and, when the packet is addressed to the terminal 2 itself, deletes the header given from the destination setting unit 307 of the gateway 3, from the packet. The destination judging unit 206 delivers the packet for which the header has been deleted, to the application unit 202 through the virtual interface 201.

When the application unit 202 of the terminal 2 has transmitted the packet to the virtual interface 201, the destination setting unit 208 of the terminal 2 captures the packet as data, gives the packet a header containing the destination information to the gateway 3, and delivers the header-attached packet to the output interface determining unit 207 of the terminal 2. The output interface determining unit 207 determines the interface to be output to, from the destination information of the header given to the packet, and notifies the packet transferring unit 205 of the terminal 2, of the interface to be output to. The packet transferring unit 205 transmits the packet using the interface that has been notified of from the output interface determining unit 207.

When the packet receiving unit 302 of the gateway 3 has received the packet from the terminal 2, the unit 302 delivers the packet to the destination judging unit 305 of the gateway 3. The destination judging unit 305 judges whether the packet is addressed to the gateway 3 itself and, when the packet is addressed to the gateway 3 itself, deletes the header given by the destination setting unit 208 of the terminal 2, from the packet. The destination judging unit 305 transmits again the header-deleted packet from the physical interface 32 of the gateway 3.

A specific example, a procedure from creation of a virtual interface to transfer path setting, a data reception procedure, and a data transmission procedure of the third embodiment are same respectively as those of the first embodiment above. In the specific example, the destination judging unit 206, the output interface determining unit 207, and the destination setting unit 208 of the terminal 2 are realized by the OS 230. The destination judging unit 305, the output interface determining unit 306, and the destination setting unit 307 of the gateway 3 are realized by the OS 330.

Figure 22:
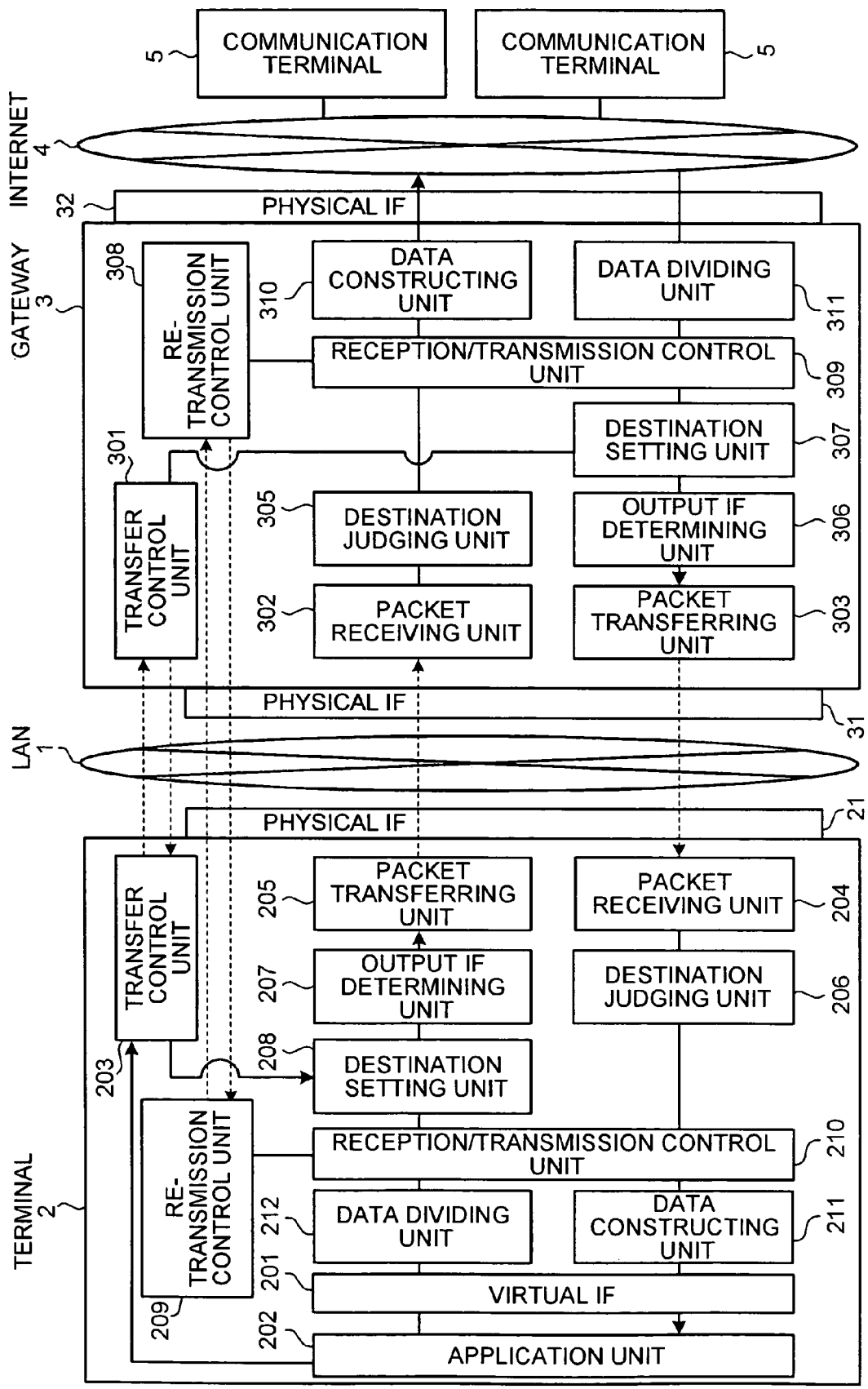
FIG. 22 is a schematic of a network system according to a fourth embodiment of the present invention.

FIG. 22 is a schematic of a network system according to a fourth embodiment of the present invention. As shown in FIG. 22, in the configuration of FIG. 5, the fourth embodiment is configured to have added the destination judging unit 206, the output interface determining unit 207, the destination setting unit 208, a re-transmission control unit 209, a transmission/reception control unit 210, a data constructing unit 211, and a data dividing unit 212 to the terminal 2 as well as to have added the destination judging unit 305, the output interface determining unit 306, the destination setting unit 307, a re-transmission control unit 308, a transmission/reception control unit 309, a data constructing unit 310, and a data dividing unit 311 to the gateway 3.

Only the points that differ from the contents of the first embodiment above will be described below. The configuration of the terminal 2 will be described. The destination judging unit 206, the output interface determining unit 207, and the destination setting unit 208 are as described in the third embodiment above. The re-transmission control unit 209 waits for a reception response for a transmitted packet and, when no response has been sent from the communication counterpart within a predetermined time period, transmits again the same packet partially or wholly. When the terminal 2 has received a packet, the re-transmission control unit 209 transmits a reception response to the transmission origin of the packet. The transmission/reception control unit 210 gives the packet a header containing transmission/reception confirmation number. The data constructing unit 211 re-constructs data that have been divided into a plurality of packets. The data dividing unit 212 divides data into a plurality of packets according to the maximum data transfer unit of the transmitting path.

The configuration of the gateway 3 will be described. The destination determining unit 305, the output interface determining unit 306, and the destination setting unit 307 are as described in the third embodiment above. The re-transmission control unit 308 waits for a reception response for a transmitted packet and, when no response has been sent from the communication counterpart within a predetermined time period, transmits again the same packet. When the gateway 3 has received a packet, the re-transmission control unit 308 transmits a reception response to the transmission origin of the packet. The transmission/reception control unit 309 gives the packet a header containing transmission/reception confirmation number. The data constructing unit 310 re-constructs data that have been divided into a plurality of packets. The data dividing unit 311 divides data into a plurality of packets according to the maximum data transfer unit of the transmitting path.

When the gateway 3 has received a packet from the communication terminal 5 on the Internet 4, the data dividing unit 311 of the gateway 3 captures the packet as data, divides the packet according to the maximum data transfer unit of the transmitting path constituting the LAN 1, and delivers the fractions (hereinafter, "packet divided pieces") to the transmission/reception control unit 309 of the gateway 3. The transmission/reception control unit 309 gives the packet divided pieces received from the data dividing unit 311 respectively a header containing a sequential confirmation number, delivers the header-attached packet divided pieces to the destination setting unit 307 of the gateway 3, and notifies the re-transmission control unit 308 of the gateway 3 of the confirmation numbers. The re-transmission control unit 308 starts up a re-transmission timer for the packet divided pieces having the confirmation numbers.

Following the above, in the process steps of the third embodiment above, the process steps up to the process step for the destination judging unit 206 of the terminal 2 to delete the header given from the destination setting unit 307 of the gateway 3, from the packet addressed to the terminal 2 itself, are executed. However, in the above description, the term, "packet" is read as "packet divided piece". Then, the destination judging unit 206 of the terminal 2 delivers the packet divided pieces to the transmission/reception control unit 210 of the terminal 2. The transmission/reception control unit 210 deletes the header given from the transmission/reception control unit 309 of the gateway 3, from the packet divided pieces received from the destination judging unit 206, and acquires the original packet divided pieces. The transmission/reception control unit 210 delivers the acquired packet divided pieces to the data constructing unit 211 of the terminal 2, and notifies the re-transmission control unit 209 of the terminal 2, of the reception of the confirmation numbers and the packet.

The re-transmission control unit 209 of the terminal 2 notifies the re-transmission control unit 308 of the gateway 3 of the packet reception notice including the confirmation numbers. The re-transmission control unit 308 of the gateway 3 clears the re-transmission timer for the packet divided pieces having the confirmation numbers notified of from the terminal 2. If the reception notice has not reached from the terminal 2 to the re-transmission control unit 308 of the gateway 3 by the time when the re-transmission timer of the gateway 3 indicates zero due to a lack of the packet divided pieces, the gateway 3 transmits again the packet divided pieces corresponding to the confirmation numbers for which the reception notices have not reached, to the terminal 2. The data constructing unit 211 of the terminal 2 retains the packet divided pieces received from the transmission/reception control unit 210, re-constructs the packet when all of the packet divided pieces created by the packet division have been collected, and delivers the packet to the application unit 202 through the virtual interface 201.

When the application unit 202 of the terminal 2 has transmitted the packet to the virtual interface 201, the data dividing unit 212 of the terminal 2 captures the packet as data, divides the packet according to the maximum data transfer unit of the transmitting path constituting the LAN 1, and delivers the packet divided pieces to the transmission/reception control unit 210 of the terminal 2. The transmission/reception control unit 210 gives a header containing a sequential confirmation number to the packet divided pieces received from the data dividing unit 212, delivers the header-attached packet divided pieces to the destination setting unit 208 of the terminal 2, and notifies the re-transmission control unit 209 of a terminal 23 of the confirmation numbers. The re-transmission control unit 209 starts up a timer for the packet divided pieces having the confirmation numbers.

Following the above, in the process steps of the third embodiment above, the process steps up to the process step for the destination judging unit 305 of the gateway 3 to delete the header given from the destination setting unit 208 of the terminal 2, from the packet addressed to the gateway 3 itself, are executed. However, in the above description, the term, "packet" is read as "packet divided piece". Then, the destination judging unit 305 of the gateway 3 delivers the packet divided pieces to the transmission/reception control unit 309 of the gateway 3. The transmission/reception control unit 309 deletes the header given from the transmission/reception control unit 210 of the terminal 2, from the packet divided pieces received from the destination judging unit 305, and acquires the original packet divided pieces. The transmission/reception control unit 309 delivers the acquired packet divided pieces to the data constructing unit 310 of the gateway 3, and notifies the re-transmission control unit 308 of the gateway 3, of the reception of the confirmation numbers and the packet.

The re-transmission control unit 308 of the gateway 3 notifies the re-transmission control unit 209 of the terminal 2 of the packet reception notice including the confirmation numbers. The re-transmission control unit 209 of the terminal 2 clears the re-transmission timer for the packet divided pieces having the confirmation numbers notified of from the gateway 3. If the reception notice has not reached from the gateway 3 to the re-transmission control unit 209 of the terminal 2 by the time when the re-transmission timer of the terminal 2 indicates zero due to a lack of the packet divided pieces, the terminal 2 transmits again the packet divided pieces corresponding to the confirmation numbers for which the reception notices have not reached, to the gateway 3. The data constructing unit 310 of the gateway 3 retains the packet divided pieces received from the transmission/reception control unit 309, re-constructs the packet when all of the packet divided pieces created by the division of the packet have been collected, and transmits again the packet from the physical interface 32 of the gateway 3.

The specific configuration of a network system according to the fourth embodiment is as shown in FIG. 6. Only the points that differ from the first embodiment above will be described below. In the fourth embodiment, encapsulation is executed by a TCP/IP header when a packet is transferred between the terminal 2 and the gateway 3. Therefore, the OS 230 of the terminal 2 acquires the IP address of the gateway 3 from the transfer table 241 for a packet that uses the virtual interface 201 as the interface for the packet to be output to, and executes processing corresponding to the TCP layer (encapsulation by an TCP/IP header) according to the specifications of TCP/IP. The OS 330 of the gateway 3 acquires the IP address of the terminal 2 from the transfer table 341 of the gateway 3 for a packet that is addressed to the OS 330, and executes processing corresponding to the TCP layer (encapsulation by an TCP/IP header) according to the specifications of TCP/IP.

The TCP protocol has a function of dividing a packet into packet divided pieces and executing reception confirmation processing and re-transmission controlling processing. Therefore, by executing encapsulation using a TCP/IP header, a packet can be transferred between the terminal 2 and the gateway 3 guaranteeing reliability thereof. In the specific example, the destination judging unit 206, the output interface determining unit 207, the destination setting unit 208, the re-transmission control unit 209, the transmission/reception control unit 210, the data constructing unit 211, and the data dividing unit 212 of the terminal 2 are realized by the OS 230. The destination judging unit 305, the output interface determining unit 306, the destination setting unit 307, the re-transmission control unit 308, the transmission/reception control unit 309, the data constructing unit 310, and the data dividing unit 311 of the gateway are realized by the OS 330.

A procedure from creation of a virtual interface to transfer path setting, a data reception procedure, and a data transmission procedure of the fourth embodiment are basically same respectively as those of the first embodiment above. The processing sequence for packet reception and the processing sequence for transmitting a packet are respectively as shown in FIG. 12 and FIG. 14. The reception confirming processing and the re-transmission controlling processing are realized using the processing in the TCP layer.

Figure 23:
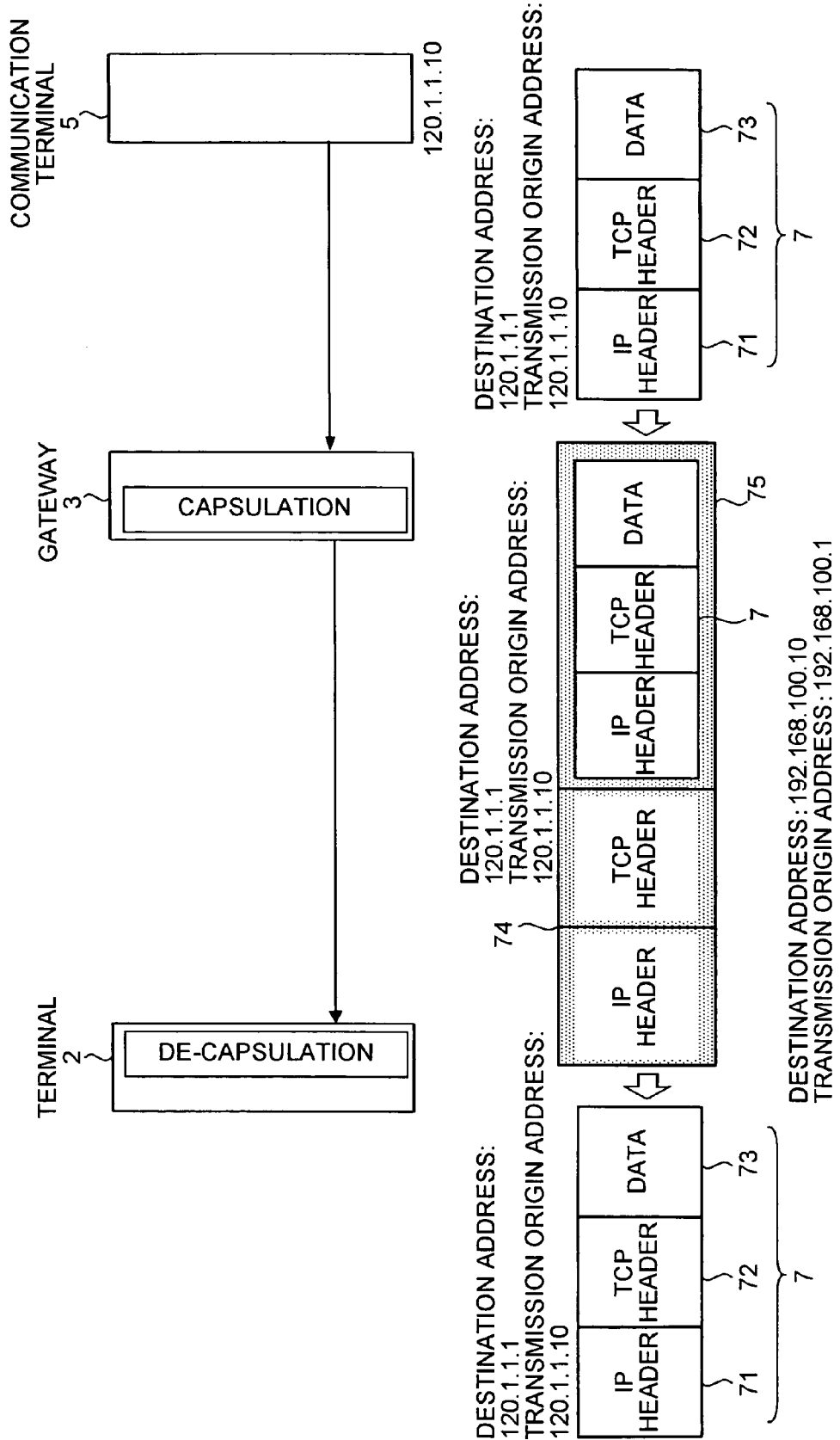
FIG. 23 is a schematic for illustrating a transition of packet formats at the time of reception of a packet in the network system according to the fourth embodiment.

FIG. 23 illustrates the transition of packet formats at the time of reception of a packet (in uplink transfer). When the OS 330 of the gateway 3 receives data, the OS 330 executes encapsulation using the IP header, for which the IP address, [192.168.100.10] of the terminal 2 is set as the destination address, and a TCP header as a transfer path ID 74. The OS 230 of the terminal 2 deletes the TCP/IP header (transfer path ID 74) for encapsulation from the encapsulated packet 75.

Figure 24:
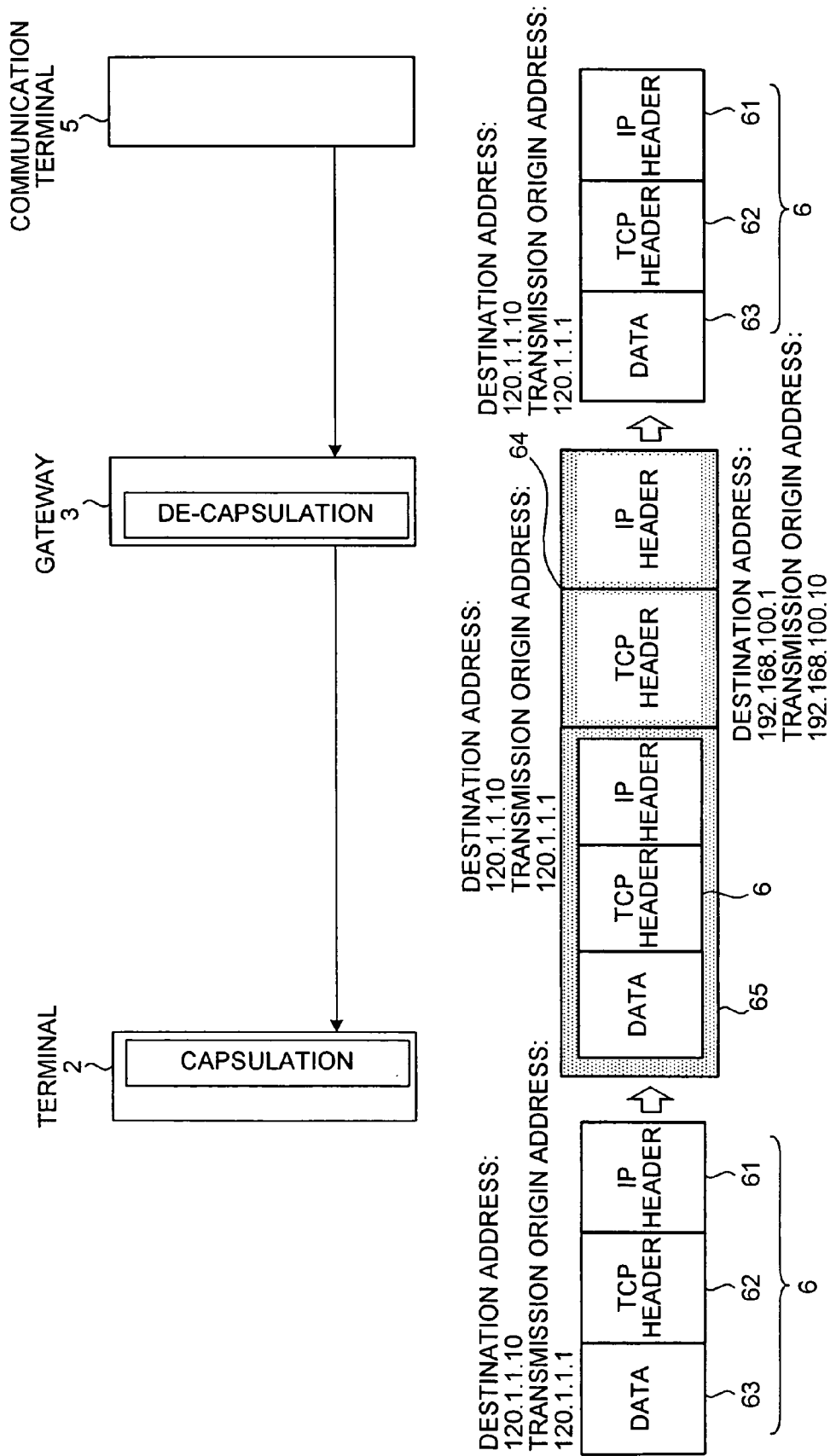
FIG. 24 is a schematic for illustrating a transition of packet formats at the time of transmission of a packet in the network system according to the fourth embodiment.

FIG. 24 illustrates transition of packet formats at the time of transmission of a packet (in downlink transfer) When the OS 230 of the terminal 2 transmits data, the OS 230 executes encapsulation using the IP header, for which the IP address, [192.168.100.1] of the physical interface 31 of the gateway 3 is set as the destination address, and a TCP header as a transfer path ID 64. The OS 330 of the gateway 3 deletes the TCP/IP header (transfer path ID 64) for encapsulation from the encapsulated packet 65.

Figure 25:
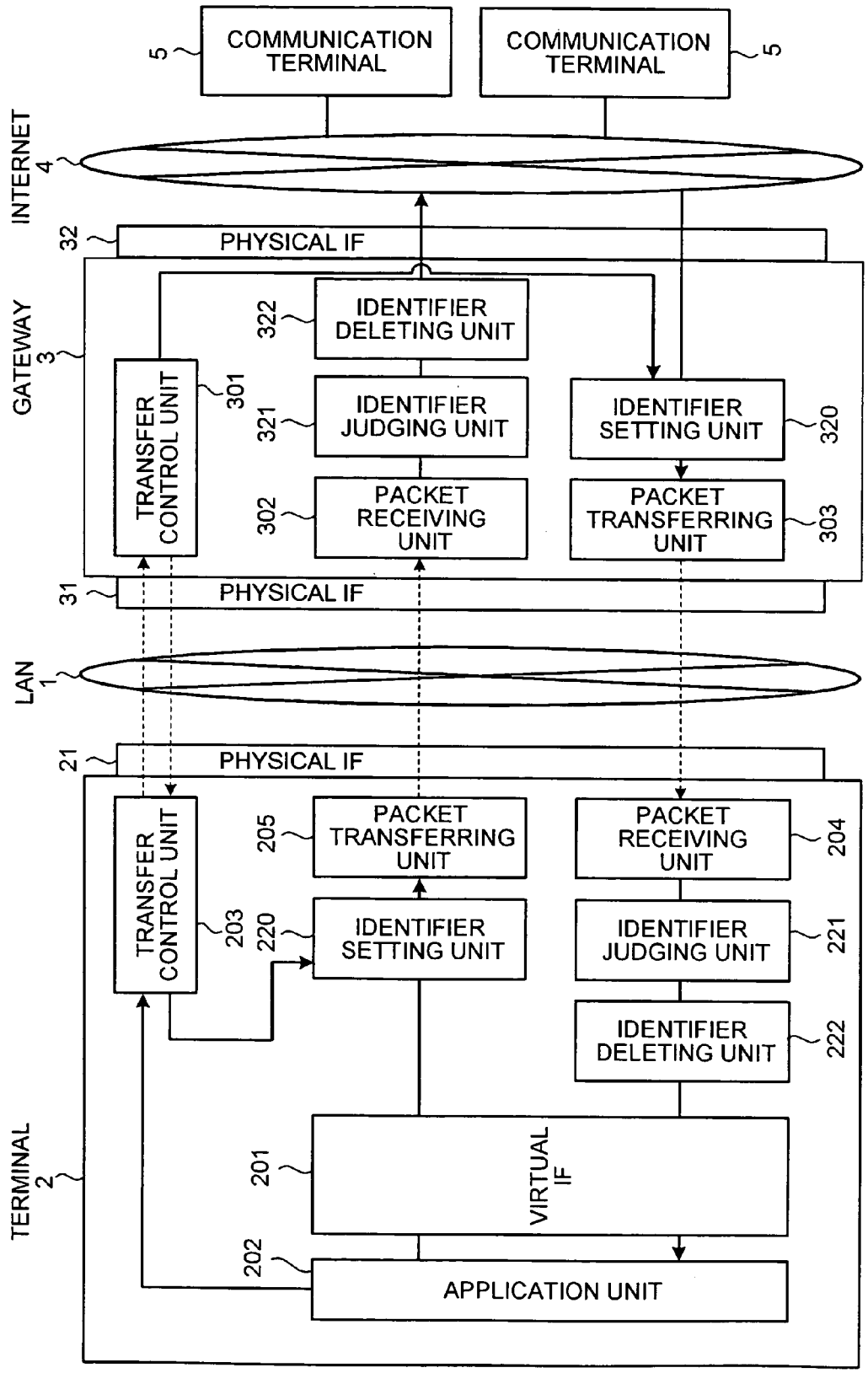
FIG. 25 is a schematic of a network system according to a fifth embodiment of the present invention.

FIG. 25 is a schematic of a network system according to a fifth embodiment of the present invention. As shown in FIG. 25, in the configuration of FIG. 5, the fifth embodiment is configured to have added an identifier setting unit 220, an identifier judging unit 221, and an identifier deleting unit 222 to the terminal 2 as well as to have added an identifier setting unit 320, an identifier judging unit 321, and an identifier deleting unit 322 to the gateway 3.

Only the points that differ from the contents of the first embodiment above will be described below. The configuration of the terminal 2 will be described. The identifier setting unit 220 gives an identifier to a packet. The identifier judging unit 221 judges whether an identifier for delivering the packet to the terminal 2 is attached to a packet. When the identifier is attached, the identifier deleting unit 222 deletes the identifier attached to a packet.

The configuration of the gateway 3 will be described. The identifier setting unit 320 gives an identifier to a packet. The identifier judging unit 321 judges whether an identifier for delivering the packet to the gateway 3 is attached to a packet and, when the identifier is attached, judges whether the packet is processed by the gateway 3 itself based on the type of the identifier. The identifier deleting unit 322 deletes the identifier attached to a packet.

Only the points that differ from the contents of the first embodiment above will be described below. When a communication port for the virtual interface 201 is opened, the transfer control unit 203 of the terminal 2 transmits an identifier to the gateway 3 as a transfer path setting request. The identifier is only given to a packet that is transferred between the terminal 2 and the gateway 3. The terminal 2 and the gateway 3 judge whether a packet is to be processed based on the presence or absence of this identifier.

The transfer control unit 301 of the gateway 3 acquires the identifier for delivering the packet to the terminal 2, from the transfer path setting request, and delivers the identifier to the identifier setting unit 320 of the gateway 3. The transfer control unit 301 of the gateway 3 transmits the identifier for delivering the packet to the gateway 3, to the terminal 2 as a transfer path setting response. The transfer control unit 203 of the terminal 2 acquires the identifier for delivering the packet to the gateway 3, from the transfer path setting response, and delivers the identifier to the identifier setting unit 208 of the terminal 2.

When the gateway 3 has received the packet from the communication terminal 5 on the Internet 4, the identifier setting unit 320 of the gateway 3 gives the packet the identifier received from the terminal 2, and delivers the identifier-attached packet to the packet transferring unit 303 of the gateway 3. The packet transferring unit 303 transmits the packet delivered from the identifier setting unit 320 to all equipments in the same segment.

When the packet receiving unit 204 of the terminal 2, that is present in the same segment as that of the gateway 3, has received the packet from the gateway 3, the unit 204 delivers the packet to the identifier judging unit 221 of the terminal 2. The identifier judging unit 221 judges whether an identifier, which the terminal 2 transmits to the gateway 3, is attached to the packet and, when an identifier is attached, and delivers the packet to the identifier deleting unit 222 of the terminal 2. When no identifier is attached, the identifier judging unit 221 discards the packet. The identifier deleting unit 222 deletes the identifier from the packet delivered from the identifier judging unit 221, and delivers the packet for which the identifier has been deleted, to the application unit 202 through the virtual interface 201.

When the application unit 202 of the terminal 2 has transmitted the packet toward the virtual interface 201, the identifier setting unit 220 of the terminal 2 gives the identifier received from the gateway 3 to the packet, and delivers the identifier-attached packet to the packet transferring unit 205 of the terminal 2. The packet transferring unit 205 transmits the packet that has been delivered from the identifier setting unit 220 to all equipments in the same segment.

When the packet receiving unit 302 of the gateway 3, that is present in the same segment as that of the terminal 2, has received the packet from the terminal 2, the unit 302 delivers the packet to the identifier judging unit 321 of the gateway 3. The identifier judging unit 321 judges whether an identifier, which the gateway 3 transmits to the terminal 2, is attached to the packet and, when an identifier is attached, and delivers the packet to the identifier deleting unit 322 of the gateway 3. When no identifier is attached, the identifier judging unit 321 discards the packet. The identifier deleting unit 322 deletes the identifier from the packet delivered from the identifier judging unit 321, and transmits again the packet for which the identifier has been deleted, from the physical interface 32 of the gateway 3.

The detailed configuration of a network system according to the fifth embodiment is as shown in FIG. 6. Only the points that differ from the first embodiment above will be described below. The fifth embodiment executes capsulation using a "shim header" of MPLS when packets are transferred between the terminal 2 and the gateway 3. Therefore, an unused shim label is contained in a transfer path setting request transmitted from the transfer control unit 203 of the terminal 2 to the gateway 3.

The transfer control unit 203 of the terminal 2 registers the shim label contained in the transfer path setting request and the interface from which the transfer path setting request has been received, into the transfer table 241 of the terminal 2. The packet receiving unit 204 of the terminal 2 receives the packet distributed from the gateway 3, and delivers the packet to the OS 230 of the terminal 2. The packet transferring unit 205 of the terminal 2 receives the packet from the OS 230 and distributes the packet to all equipments in the same segment.

Figure 26:
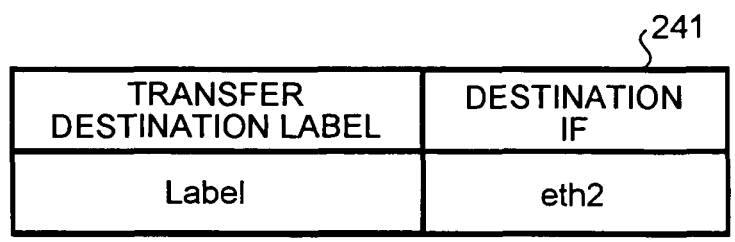
FIG. 26 is a schematic for illustrating a transfer table of a terminal according to the fifth embodiment.

The OS 230 of the terminal 2 acquires a shim label for delivering the packet to the gateway 3, from the transfer table 241 of the terminal 2 for the packet using the virtual interface 201 as the interface to be output to thereof, and gives the label to the packet. The OS 230 judges whether the shim label, which is acquired for the gateway 3, is attached to the received packet, deletes the label when the shim label is attached, and executes reception processing. The transfer table 241 of the terminal 2 stores the shim header that encapsulates a packet transferred between the terminal 2 and the gateway 3. An example of the transfer table 241 is shown in FIG. 26. As shown in FIG. 26, a transfer destination label represented as "Label", and "eth2" as the interface name corresponding to the label are registered in the transfer table 241. The route table 242 of the terminal 2 is same as that of FIG. 8.

The transfer control unit 301 of the gateway 3 registers the shim label contained in the transfer path setting request into the transfer table 341 of the gateway 3. The transfer control unit 301 transmits to the terminal 2 a transfer path setting response containing the shim label contained in the transfer path setting request. The packet receiving unit 302 of the gateway 3 receives the packet that has been distributed from the terminal 2, and delivers the packet to the OS 330 of the gateway 3. The packet transferring unit 303 of the gateway 3 receives the packet from the OS 330 and distributes the packet to all equipments in the same segment.

Figure 27:
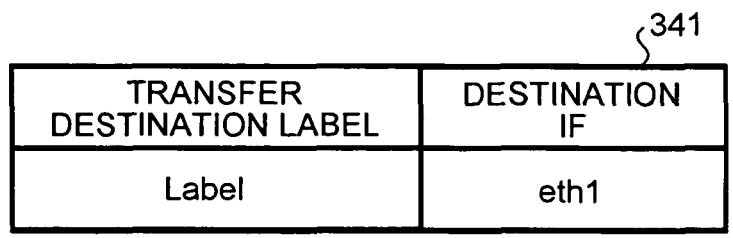
FIG. 27 is a schematic for illustrating a transfer table of a gateway according to the fifth embodiment.

The OS 330 of the gateway 3 acquires a shim label for delivering the packet to the terminal 2, from the transfer table 341 of the gateway 3 for the packet addressed to the gateway 3 itself received from the communication terminal 5 on the Internet, and gives the label to the packet. The OS 330 judges whether the shim label, which is acquired for the terminal 2, is attached to the received packet, and deletes the label when the shim label is attached, and executes relay processing. The transfer table 341 of the gateway 3 stores the shim header that encapsulates a packet transferred between the terminal 2 and the gateway 3. An example of the transfer table 341 is shown in FIG. 27. As shown in FIG. 27, a transfer destination label represented as "Label", and "eth1" as the interface name corresponding to the label are registered in the transfer table 341. The route table 342 of the gateway 3 is same as that of FIG. 10.

In the specific example, the identifier setting unit 220, the identifier judging unit 221, and the identifier deleting unit 222 of the terminal 2 are realized by the OS 230. The identifier setting unit 320, the identifier judging unit 321, and the identifier deleting unit 322 of the gateway 3 are realized by the OS 330.

Only the points that differ from the contents of the first embodiment above will be described below. The processing sequence of this setting procedure is as shown in FIG. 11. At step S202 of FIG. 11, the transfer control unit 203 of the terminal 2 transmits to the gateway 3 the shim label represented as "Label" as a transfer path setting request. At step S203, the transfer control unit 310 of the gateway 3 registers, from the transfer path setting request, the shim label represented as "Label" and the name "eth1" of the physical interface 31 of the gateway 3 at which the transfer path setting request has been received, into the transfer table 341 of the gateway 3 correlating the shim label and the name.

At step S204, the transfer control unit 301 transmits to the terminal 2 the shim label represented as "Label" as a transfer path setting response. At step S205, the transfer control unit 203 of the terminal 2 registers, from the transfer path setting response, the shim label represented as "Label" and the name "eth2" of the physical interface 21 of the terminal 2 at which the transfer path setting response has been received, into the transfer table 241 of the terminal 2 correlating the shim label and the name.

Figure 28:
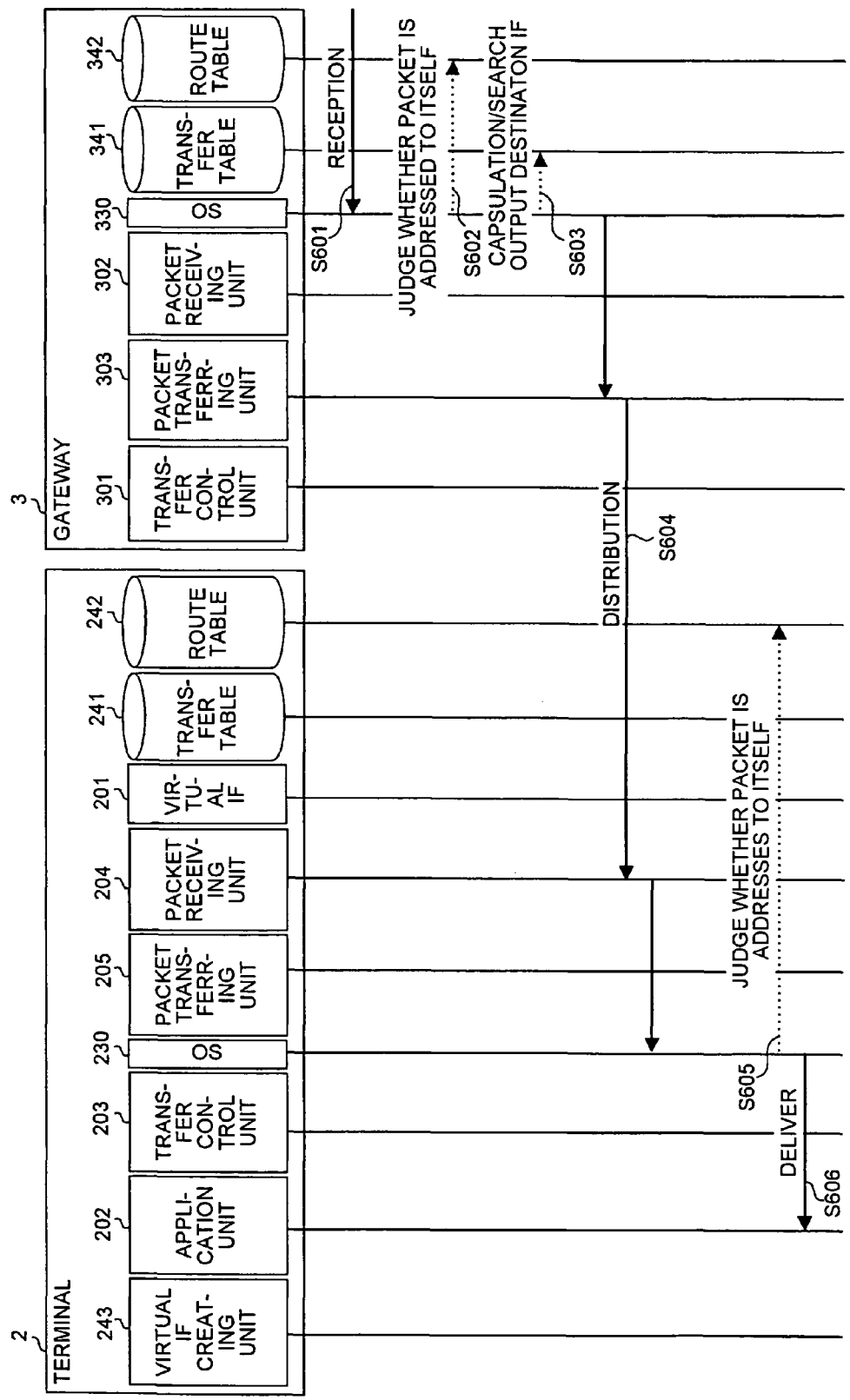
FIG. 28 is a schematic for illustrating a process sequence at the time of reception of a packet in the network system according to the fifth embodiment.
Figure 29:
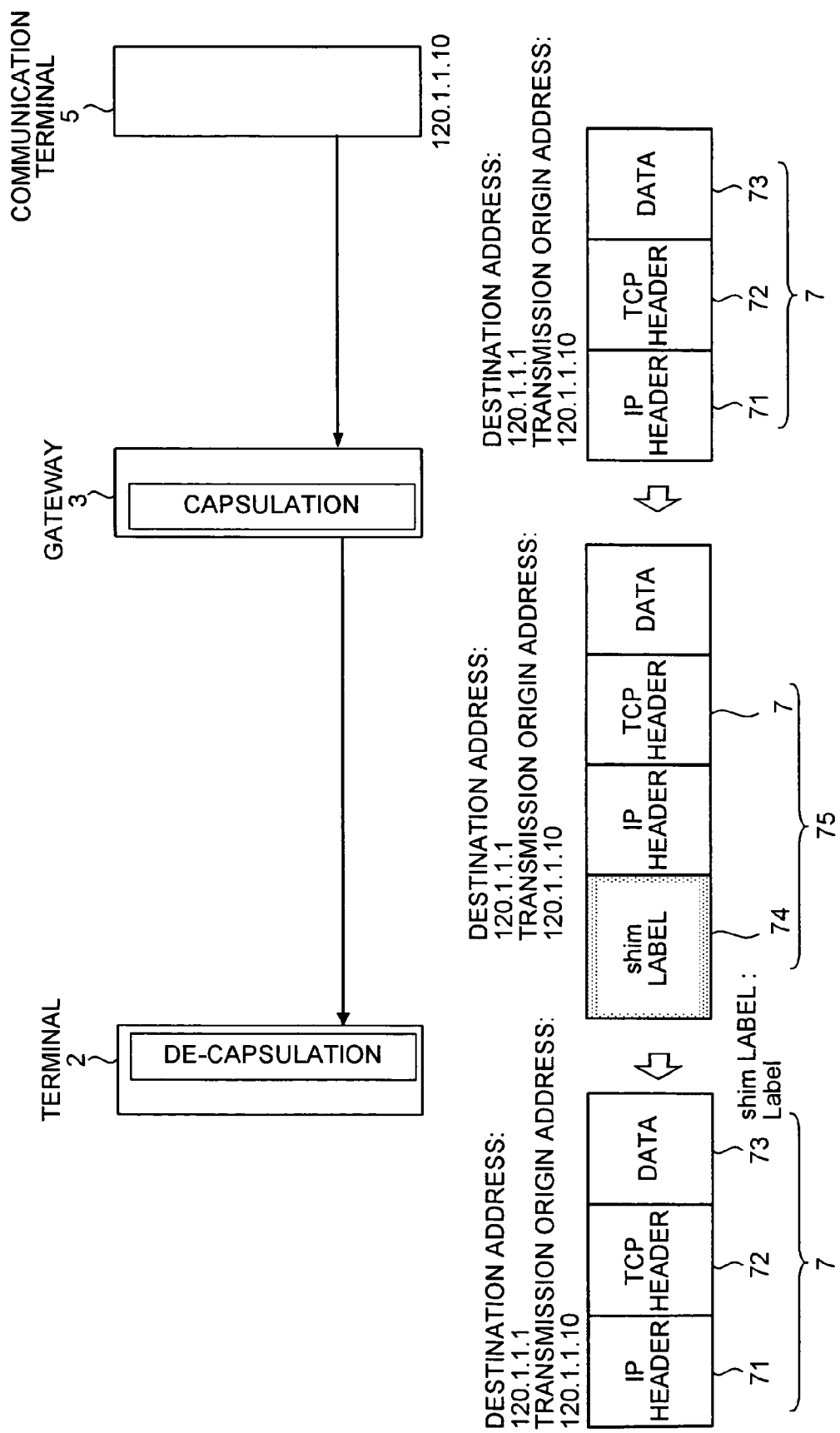
FIG. 29 is a schematic for illustrating a transition of packet formats at the time of reception of a packet in the network system according to the fifth embodiment.

FIG. 28 is a schematic for illustrating a process sequence at the time of reception of a packet. FIG. 29 is a schematic for illustrating a transition of packet formats at the time of reception of a packet (in uplink transfer). When the gateway 3 has received the packet 7 with the destination address, [120.1.1.1], from the communication terminal 5 (IP address: [120.1.1.10]) on the Internet 4 (step S601), the OS 330 of the gateway 3 refers to the route table 342 of the gateway 3 using the destination address, [120.1.1.1] of the packet 7 as a key. No interface to be output to corresponding to the destination address, [120.1.1.1] is present in the route table 342 (see FIG. 10). Therefore, the OS 330 judges that the received packet is addressed to the gateway 3 itself (step S602).

The OS 330 acquires the shim label represented as Label from the route table 341 of the gateway 3 (see FIG. 27), and encapsulates the packet 7 using the shim label (transfer path ID 74). The OS 330 further acquires the interface "eth1" that corresponds to the shim label represented as Label from the transfer table 341 (step S603). The OS 330 delivers the encapsulated packet 75 to the packet transferring unit 303 of the gateway 3. The packet transferring unit 303 distributes the packet 75 delivered from the OS 330 from the interface eth1 to be output to, to all the terminals in the same segment (step S604).

When the packet receiving unit 204 of the terminal 2 has received the packet 75 (shim label: Label) distributed from the gateway 3, the unit 204 delivers the packet 75 to the OS 230 of the terminal 2. The OS 230 judges whether the shim label represented as "Label" is attached to the packet 75 delivered from the packet receiving unit 204 and, when the label is attached, deletes the shim label (transfer path ID 74) from the encapsulated packet 75 (de-capsulation).

The OS 230 searches in the route table 242 using the destination address, [120.1.1.1] of the original packet 7 as a key. In the route table 242, as an interface to be output to corresponding to the destination address, [120.1.1.0/24], the virtual interface 201 (name: vif0) of the terminal 2 is listed (see FIG. 8). Therefore, the OS 230 judges that the packet 7 is addressed to the terminal 2 itself (step S605). The OS 230 identifies an application that communicates, from the communication port number of the packet 7 and delivers the packet 7 to the application unit 202 (step S606), and the series of data reception process steps in this sequence are ended.

Figure 30:
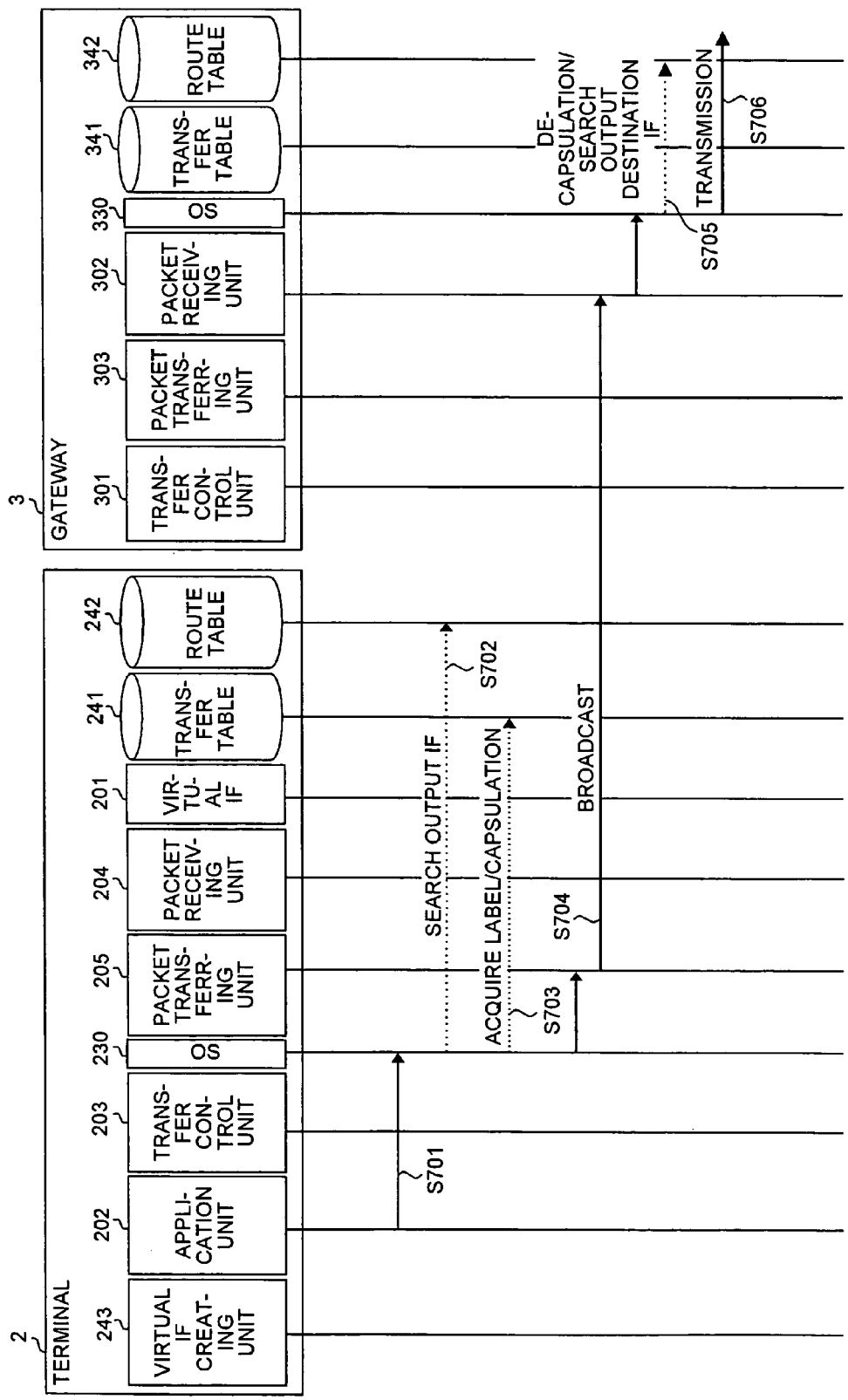
FIG. 30 is a schematic for illustrating a process sequence at the time of transmission of a packet in the network system according to the fifth embodiment.
Figure 31:
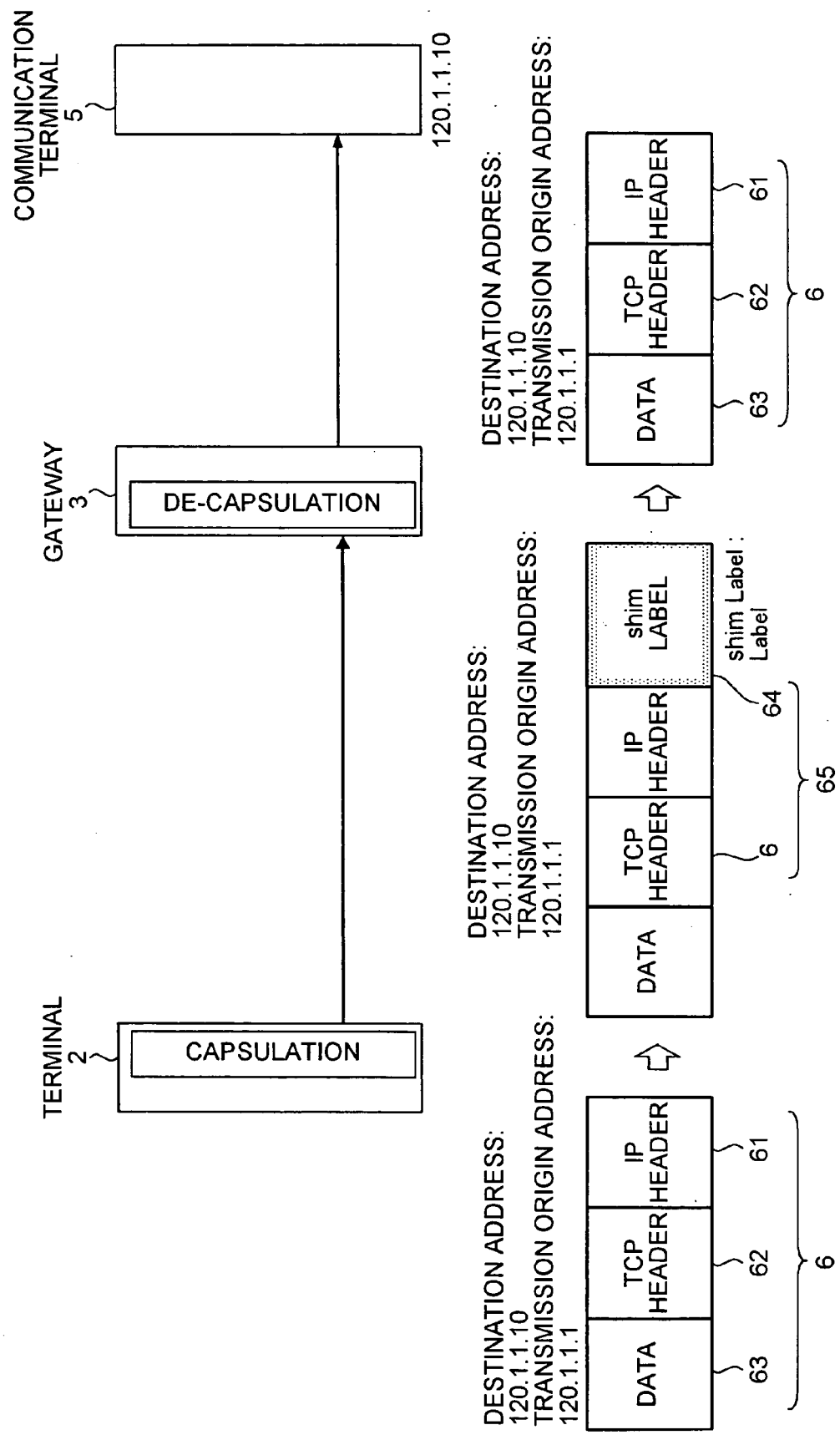
FIG. 31 is a schematic for illustrating a transition of packet formats at the time of transmission of a packet in the network system according to the fifth embodiment.

FIG. 30 is a schematic for illustrating a process sequence at the time of a packet. FIG. 31 is a schematic for illustrating a transition of packet formats at the time of transmission of packet formats for transmission of a packet (in downlink transfer). When the application unit 202 of the terminal 2 has transmitted the packet 6 addressing to the communication terminal 5 (IP address: [120.1.1.10]) on the Internet 4, the OS 230 of the terminal 2 receives the packet 6 (step S701). The OS 230 refers to the route table 242 using the destination address, [120.1.1.10] of the packet 6 as a key, and acquires the virtual interface 201 (name: vif0) of the terminal 2 as an interface to be output to (step S702, see FIG. 8).

Because the acquired interface to be output to is the virtual interface 201, the OS 230 acquires from the transfer table 241 the shim label represented as "Label" as a transfer destination label (see FIG. 26), and encapsulates the packet 6 using the shim label (transfer path ID 64) (step S703). The OS 230 further acquires from the transfer table 241 the interface eth2 that corresponds to the shim label represented as Label (S703). The OS 230 delivers the encapsulated packet 65 to the packet transferring unit 205 of the terminal 2. The packet transferring unit 205 distributes the packet 65 received from the OS 230 to all equipments in the same segment (step S704).

When the packet receiving unit 302 of the gateway 3 has received the packet 65 (shim label: Label) distributed from the terminal 2, the unit 302 delivers the packet 65 to the OS 330 of the gateway 3. The OS 330 judges whether the shim label represented as "Label" is attached to the packet delivered from the packet receiving unit 302, deletes the shim label (transfer path ID 64) from the encapsulated packet 65 when the shim label is attached (de-capsulation).

The OS 330 searches in the route table 342 using the destination address, [120.1.1.10] of the original packet 6 as a key. As an interface to be output to corresponding to the destination address, [120.1.1.0/24], the physical interface 32 (name: eth0) of the gateway 3 is listed in the route table 342 (see FIG. 10). Therefore, the OS 330 transmits the de-capsulated packet 6 from eth0 to the communication terminal 5 (IP address: [120.1.1.10]) on the Internet 4 (step S706), and the series of data transmission process steps in this sequence are ended.

When attributes of either one of the virtual interface of the terminal and the corresponding Internet side physical interface of the gateway are changed, the sixth embodiment relates to a procedure of reflecting the contents of the change on attributes of the other interface. In the sixth embodiment, transmission and reception of data (packet) between the terminal and the gateway using the virtual interface of the terminal are same as those of embodiments described above. Therefore, in this embodiment, showing in the drawings and description are omitted for the transmission and reception of data (packet) between the terminal and the gateway, and only the items relating to the change of attributes of the interface will be described.

Figure 32:
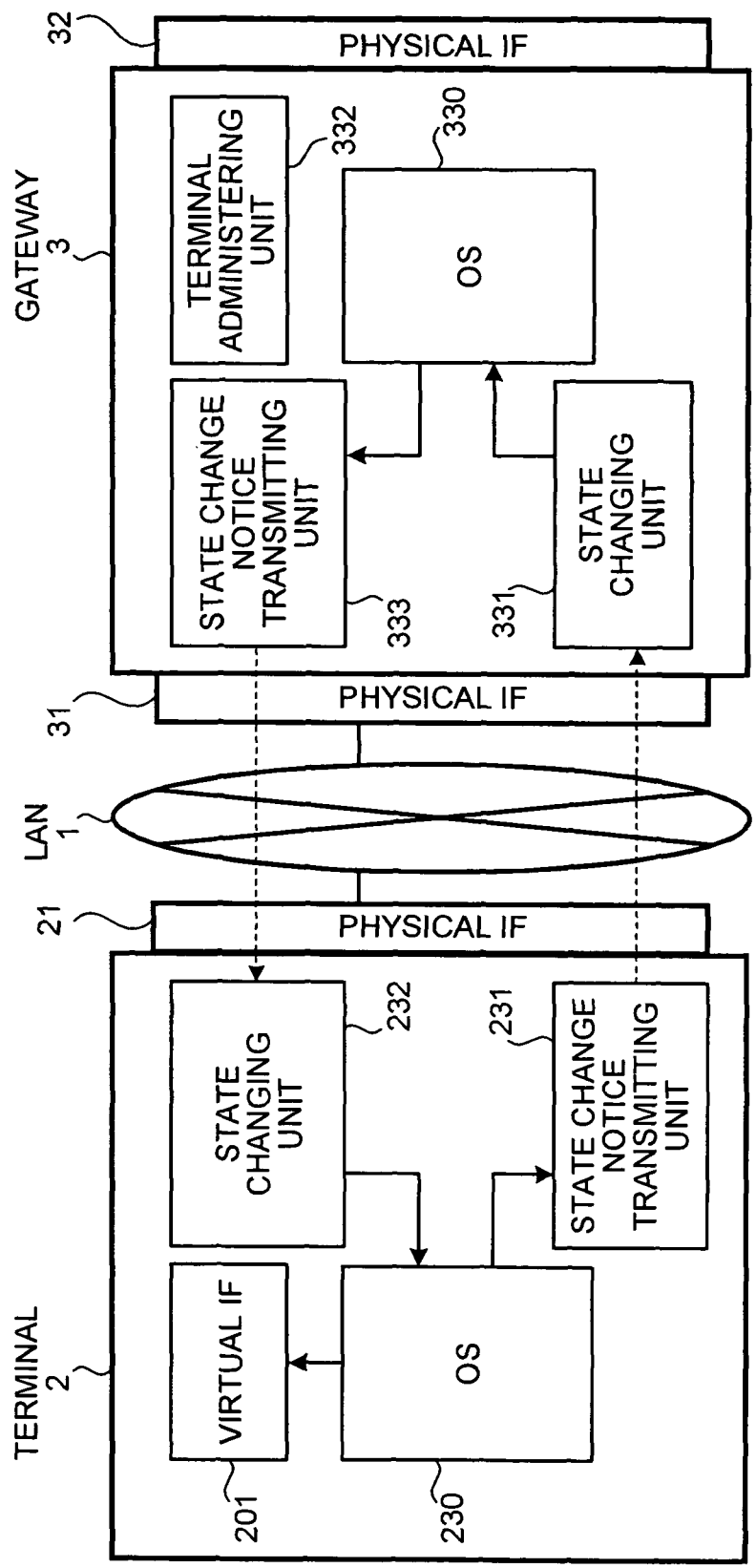
FIG. 32 is a schematic of a network system according to a sixth embodiment of the present invention.

FIG. 32 is a schematic of a network system according to the sixth embodiment. In FIG. 32, the Internet and the communication terminal on the Internet are omitted. As shown in FIG. 32, the terminal 2 includes the physical interface 21, the virtual interface 201, the OS 230, a state change notice transmitting unit 231, and a state changing unit 232. The physical interface 21, and the virtual interface 201 are as described above.

The state change notice transmitting unit 231 detects that attributes of the interface has been manipulated and analyzes the contents of the manipulation. When the target of the manipulation is the virtual interface 201, the state change notice transmission unit 231 notifies the gateway 3 of the attribute change notice. When the target of the manipulation has been the physical interface 21, the unit 231 notifies no notice. The state changing unit 232 receives the attribute change notice for the physical interface 32 notified from the gateway 3, and reflects the change of attributes onto the information of the virtual interface 201 corresponding to the physical interface 32. The OS 230 changes attributes of the designated interface according to the contents of the notified attribute change request. The OS 230 transmits a change notice indicating that attributes of the interface has been manipulated, to the state change notice transmitting unit 231.

The gateway 3 includes the physical interface 31, the physical interface 32, the OS 330, the state changing unit 331, the terminal managing unit 332, and a state change notice transmitting unit 333. The physical interface 31, and the physical interface 32 are as described above. The state changing unit 331 receives the attribute change notice for the virtual interface 201 notified from the terminal 2, and reflects the change of attributes onto the information of the physical interface 32 corresponding to the virtual interface 201. The terminal managing unit 332 has information to identify uniquely the terminal 2 that has the virtual interface 201 corresponding to the physical interface 32.

The state change notice transmitting unit 333 detects that attributes of the interface has been manipulated and analyzes the contents of the manipulation. When the target of the manipulation is the physical interface 32, the state change notice transmission unit 333 notifies the terminal 2 administered by the terminal managing unit 332 of the attribute change notice. When the target of the manipulation is the physical interface 31, the unit 333 notifies no notice. The OS 330 changes attributes of the designated interface according to the contents of the notified attribute change request. The OS 330 transmits a change notice indicating that attributes of the interface has been manipulated, to the state change notice transmitting unit 333.

A procedure taken when attributes of the virtual interface 201 is changed in the network system shown in FIG. 32 will be described. When the state change notice transmitting unit 231 of the terminal 2 has detected that attributes of the interface has been manipulated, the unit 231 analyzes the contents of the manipulation. Because the target of the manipulation is the virtual interface 201 as a result of the analysis, the unit 231 notifies the gateway 3 of the attribute change notice. When the state changing unit 331 of the gateway 3 has received the attribute change notice from the terminal 2, the unit 331 reflects the contents of the change onto the information of the physical interface 32 administered by the OS 330 of the gateway 3.

A procedure taken when attributes of the physical interface 32 is changed in the network system shown in FIG. 32 will be described. When the administrator has created the virtual interface 201 that corresponds to the physical interface 32 of the gateway 3, in the terminal 2 using the operation command, the administrator further has set in advance information that uniquely identifies the terminal 2 for which the virtual interface 201 has been created, in the terminal managing unit 332 of the gateway 3 using another command.

When the state change notice transmitting unit 333 of the gateway 3 has detected that attributes of the interface has been manipulated, the unit 333 analyzes the contents of the manipulation. Because the target of the manipulation is the physical interface 32 as a result of the analysis, the unit 333 notifies the terminal 2 administered the terminal managing unit 332 of the attribute change notice. When the state changing unit 232 of the terminal 2 has received the attribute change notice from the gateway 3, the unit 2232 reflects the contents of the change onto the information of the virtual interface 201 administered by the OS 230 of the terminal 2.

Figure 33:
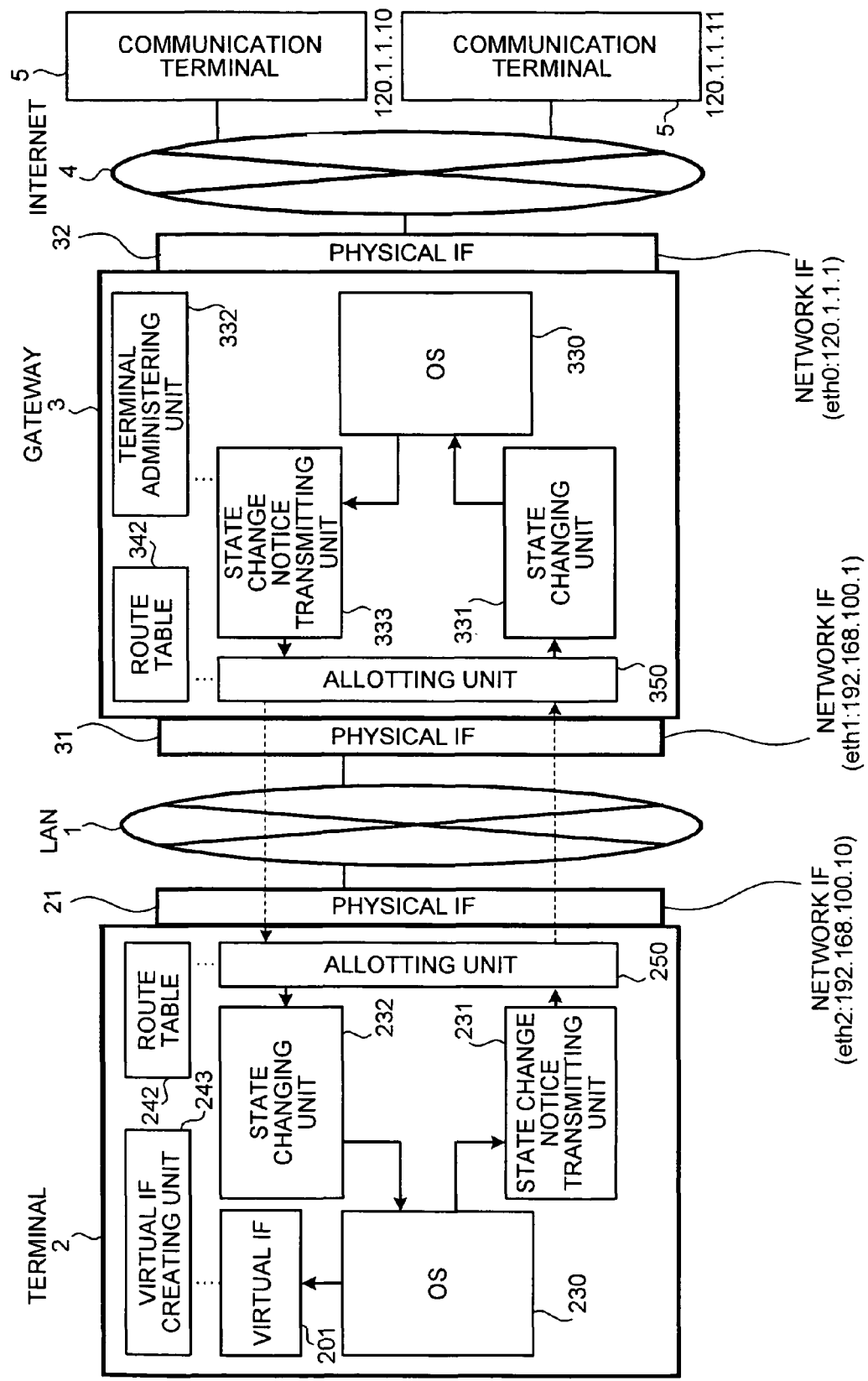
FIG. 33 is a schematic for illustrating detailed configuration of the network system according to the sixth embodiment.

A specific example of the sixth embodiment will be described. FIG. 33 is a schematic for illustrating detailed configuration of the network system according to the sixth embodiment. As shown in FIG. 33, the terminal 2 includes the physical interface 21, the virtual interface 201, the OS 230, the state change notice transmitting unit 231, the state changing unit 232, the route table 242, the virtual interface creating unit 243, and a allotting unit 250. The physical interface 21, the virtual interface 201, the route table 242, and the virtual interface creating unit 243 are as described in the first embodiment.

The allotting unit 250 receives a packet and judges whether the packet is addressed to the terminal 2 itself referring to the route table 242. The allotting unit 250 determines an interface to be output to for the packet referring to the route table 242 and transmits the packet from the interface to be output to. The state change notice transmitting unit 231 receives a change notice for attributes of the interface from the OS 230 and analyzes the contents of the change. When the target of the change is the virtual interface 201, the state change notice transmitting unit 231 notifies the gateway 3 of the attribute change notice.

The state changing unit 232 receives the attribute change notice notified from the gateway 3, and notifies using "ioctl" the OS 230 of an attribute change request for the corresponding virtual interface 201. The OS 230 changes attributes of the designated interface according to the contents of the notified attribute change request. The OS 230 transmits a change notice indicating that attributes of the interface has been manipulated, to the process that opens a routing socket thereof.

The gateway 3 includes the physical interface 31, the physical interface 32, the OS 330, the state changing unit 331, the terminal managing unit 332, the state change notice transmitting unit 333, the route table 342, and an allotting unit 350. The physical interface 31, the physical interface 32, and the route table 342 are as described in the first embodiment.

The allotting unit 350 receives a packet and judges whether the packet is addressed to the gateway 3 itself referring to the route table 342. The allotting unit 250 determines an interface to be output to for the packet referring to the route table 342 and transmits the packet from the interface to be output to. The state changing unit 331 receives an attribute change notice of the virtual interface 201 notified from the terminal 2 and notifies using "ioctl" the OS 330 of an attribute change request for the corresponding physical interface 32.

The state change notice transmitting unit 333 receives a change notice of attributes of the interface from the OS 330 and analyzes the contents of the change. When the target of the change is the physical interface 32, the state change notice transmitting unit 333 notifies the terminal 2 of the attribute change notice. The OS 330 changes attributes of the designated interface according to the contents of the notified attribute change request. The OS 330 transmits a change notice indicating that attributes of the interface has been manipulated, to the process that opens a routing socket thereof.

Figure 34:
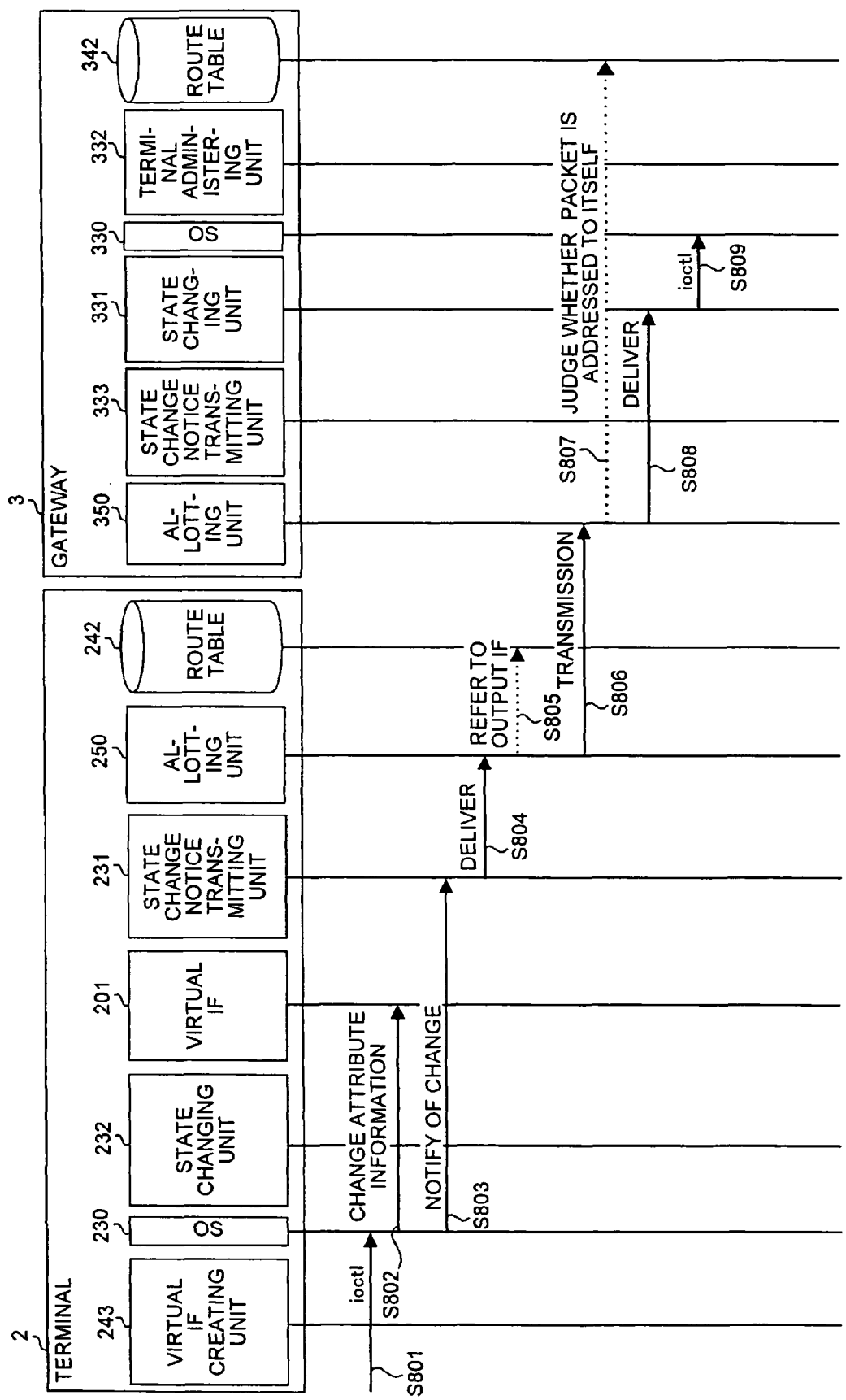
FIG. 34 is a schematic for illustrating a process sequence at the time of changing attributes of a virtual interface in the network system according to the sixth embodiment.

The operation of the network system shown in FIG. 33 will be described. A procedure taken when attributes of the virtual interface 201 of the terminal 2 is changed will be described taking an example of the case where the state of the virtual interface 201 is changed from a UP state to a DOWN state. FIG. 34 is a diagram showing a processing sequence for changing attributes of the virtual interface.

Figure 35:
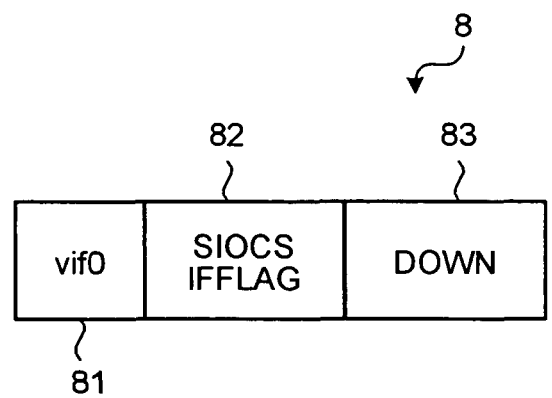
FIG. 35 is a schematic for illustrating an instruction format issued by "ioctl" according to the sixth embodiment.

The state change notice transmitting unit 231 has in advance opened a routing socket to receive a change notice of attributes of an interface from the OS 230 of the terminal 2. As shown in FIG. 34, the administrator uses the API represented as "ioctl" when the administrator changes attributes of the interface (step S801). FIG. 35 shows an example of an instruction format issued by the API. As shown in FIG. 35, an instruction format 8 consists of a change target interface name 81, a processing type 82, and a setting value 83. An instruction in the example shown contains the interface name "vif0" for which attributes are changed, and a DOWN flag indicating the contents of the change of attributes. "vif0" is the name of the virtual interface 201 of the terminal 2.

Figure 36:
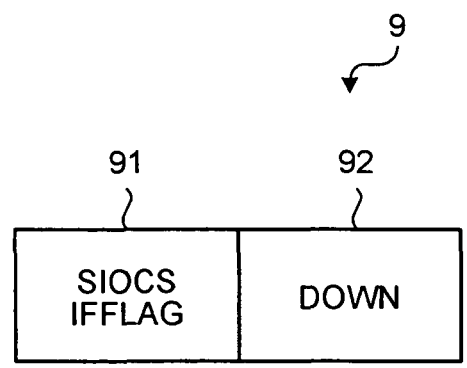
FIG. 36 is a schematic for illustrating an attribute change notice according to the sixth embodiment.

Returning to FIG. 34, the OS 230 of the terminal 2 changes the state of the virtual interface 201 of the terminal 2 to the DOWN state according to the contents of ioctl issued by the administrator (step S802), and transmits an attribute change notice to the state change notice transmitting unit 231 of the terminal 2 that opens a routing socket (step S803). An example of the attribute change notice is shown in FIG. 36. An attribute change notice 9 of the example shown contains a processing type 91 and a setting value 92.

Returning to FIG. 34, the state change notice transmitting unit 231 analyzes the attribute change notice received from the OS 230, and acquires the name, vif0 of the interface to be changed. Because "vif0" coincides with the name of the virtual interface 201, the state change notice transmitting unit 231 creates another attribute change notice and delivers this notice to the allotting unit 250 of the terminal 2 (step S804). The allotting unit 250 determines an interface to be output to referring to the route table 242 of the terminal 2 (step S805), and transmits the attribute change notice to the gateway 3 (step S806). The route table 242 of the terminal 2 used this time is as shown in FIG. 8.

When the interface name acquired from the attribute change notice does not coincide with the name of the virtual interface 201, the state change notice transmitting unit 231 does nothing. The allotting unit 350 of the gateway 3 judges whether the attribute change notice received from the terminal 2 is addressed to the gateway 3 itself referring to the route table 342 of the gateway 3 (step S807), and delivers the attribute change notice addressed to the gateway 3 itself to the state changing unit 331 of the gateway 3 (step S808). The state changing unit 331 acquires the contents of the change (DOWN flag) from the attribute change notice addressed to the gateway 3 itself and issues "ioctl" to the OS 330 of the gateway 3 to change the state of the physical interface 32 to "DOWN" (step S809), and the series of the attribute change process steps in this sequence are ended.

Figure 37:
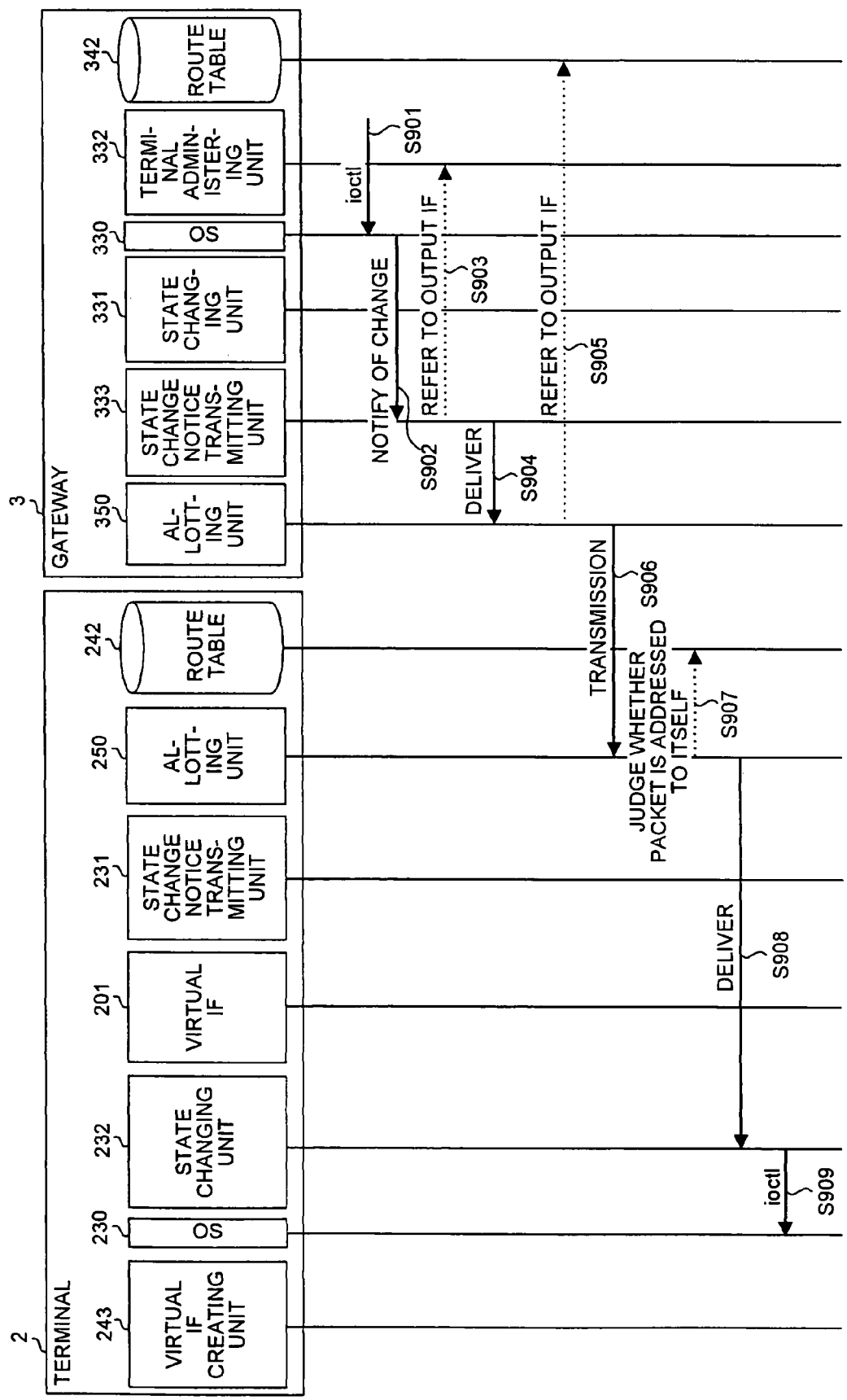
FIG. 37 is a schematic for illustrating a process sequence at the time of changing attributes of a physical interface in the network system according to the sixth embodiment.

A procedure for the case where the state of the physical interface 32 is changed from the UP state to the DOWN state due to a fault of a cable connected to the physical interface 32 of the gateway 3 will be described. FIG. 37 is a schematic for illustrating a process sequence at the time of changing attributes of the physical interface on the Internet side.

Figure 38:
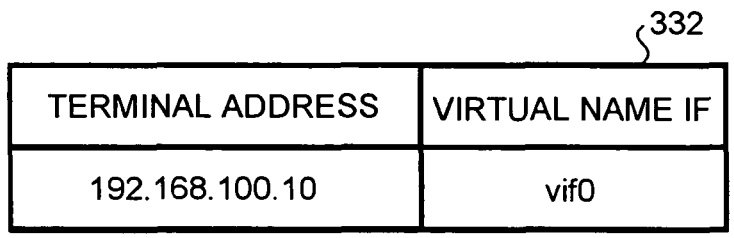
FIG. 38 is a schematic for illustrating a terminal managing unit of the gateway according to the sixth embodiment.

The administrator has in advance registered the IP address, [192.168.100.10] of the terminal 2 that has created the virtual interface 201, into the terminal managing unit 332 of the gateway 3. FIG. 38 illustrates the terminal managing unit 332 for this registration. The state change notice transmitting unit 333 of the gateway 3 has opened a routing socket to receive the change notice of attributes of the interface from the OS 330 of the gateway 3. As shown in FIG. 37, the OS 330 of the gateway 3 receives ioctl issued by the fault of the cable (step S901)

The OS 330 changes the state of the physical interface 32 to the DOWN state according to the contents of ioctl, and transmits the attribute change notice (see FIG. 36) to the state change notice transmitting unit 333 of the gateway 3 that opens the routing socket thereof (step S902). In this case, no unit that detects the fault of the cable and issues ioctl to the OS 330 is specified. For example, a process for monitoring the state of the interface may have been started up.

The state change notice transmitting unit 333 of the gateway 3 analyzes the attribute change notice received from the OS 330, and acquires the name eth0 of the interface to be changed. Because "eth0" coincides with the name of the physical interface 32, the state change notice transmitting unit 333 refers to the terminal managing unit 332 of the gateway 3, and acquires the IP address, [192.168.100.10] of the terminal 2 for which the virtual interface 201 has been created (step S903). The attribute change notice transmitting unit 333 creates another attribute change notice, and delivers the notice to the allotting unit 350 of the gateway 3 (step S904).

The allotting unit 350 determines an output interface referring to the route table 342 of the gateway 3 (step S905), and transmits the attribute change notice to the terminal 2 having the IP address, [192.168.100.10] (step S906). The route table 342 of the gateway 3 used this time is as shown in FIG. 10. When the interface name acquired from the attribute change notice does not coincide with the name of the physical interface 32, the state change notice transmitting unit 333 does nothing.

The allotting unit 250 of the terminal 2 judges whether the attribute change notice received from the gateway 3 is addressed to the terminal 2 itself referring to the route table 242 of the terminal 2 (step S907), and delivers the attribute change notice addressed to the terminal 2 itself to the state changing unit 232 of the terminal 2 (step S908). The state changing unit 232 acquires the contents of the change (DOWN flag) from the attribute change notice addressed to the terminal 2 itself and issues "ioctl" to the OS 230 of the terminal 2 to change the state of the virtual interface 201 to "DOWN" (step S909), and the series of the attribute change process steps in this sequence are ended.

A seventh embodiment according to the present invention is an example for the case where a plurality of terminals are provided in the private network in the configuration of FIG. 32. Only the points that differ from the sixth embodiment above will be described below. The state changing unit 331 of the gateway 3 notifies information that uniquely specifies the terminal 2 that has received the attribute change notice, to the state change notice transmitting unit 333 of the gateway 3 through the OS 330 of the gateway 3. The state change notice transmitting unit 333 of the gateway 3 receives the information that uniquely specifies the terminal 2 from the state changing unit 331 of the gateway 3.

When the target of manipulation for attributes is the physical interface 32, the state change notice transmitting unit 333 executes an operation of the following (1) or (2): (1) The unit 333 receives information of the terminal that has received the attribute change notice, from the state changing unit 331 of the gateway 3, and transmits the attribute change notices to the terminals other than the above terminal; and (2) The unit 333 receives information of the terminal that has received the attribute change notice, from the state changing unit 331 of the gateway 3, and transmits the attribute change notices to all the terminals administered by the terminal managing unit 332.

A procedure for the case where attributes of the physical interface of the gateway is changed by an event on the terminal side (change of attributes of the virtual interface) in the network system of the seventh embodiment, will be described. When the state change notice transmitting unit 231 of the terminal has detected that attributes of the interface has been manipulated, the unit 231 analyzes the contents of the manipulation. Because the target of the manipulation is the virtual interface 201 as a result of the analysis, the unit 231 notifies the gateway 3 of the attribute change notice.

When the state changing unit 331 of the gateway 3 has received the attribute change notice terminal 2, the unit 331 notifies the state change notice transmitting unit 333 of the gateway 3 of information that uniquely specifies the terminal that has received the attribute change notice, and reflects the contents of the change onto the information of a corresponding physical interface 32. The state change notice transmitting unit 333 detects the attribute manipulation of the physical interface 32 by the state changing unit 331, and notifies the terminals except the terminal that has been notified from the state changing unit 331 in the terminals administered by the terminal managing unit 332 of the gateway 3, of the attribute change notice.

The gateway 3 includes the physical interface 31, the physical interface 32, the OS 330, a state changing unit 331, a terminal managing unit 332, and the state change notice transmitting unit 333. The physical interface 31, and the physical interface 32 are as described above. The state changing unit 331 receives the attribute change notice for the virtual interface 201 notified from the terminal 2, and reflects the change of attributes onto the information of the physical interface 32 corresponding to the virtual interface 201. The terminal managing unit 332 has information to identify uniquely the terminal 2 that has the virtual interface 201 corresponding to the physical interface 32.

The state change notice transmitting unit 333 detects that attributes of the interface has been manipulated and analyzes the contents of the manipulation. When the target of the manipulation is the physical interface 32, the state change notice transmission unit 333 notifies the terminal 2 administered by the terminal managing unit 332 of the attribute change notice. When the target of the manipulation is the physical interface 31, the unit 333 notifies no notice. The OS 330 changes attributes of the designated interface according to the contents of the notified attribute change request. The OS 330 transmits a change notice indicating that attributes of the interface has been manipulated, to the state change notice transmitting unit 333.

A procedure for the case where attributes of the physical interface of the gateway are changed by an event (for example, shift of the state to DOWN due to a fault on a cable) on the gateway side in the network system of the seventh embodiment, will be described. When the administrator has created the virtual interface 201 that corresponds to the physical interface 32 of the gateway 3, in the terminal using the operation command, the administrator further has set in advance information that uniquely identifies the terminal for which the virtual interface 201 has been created, in the terminal managing unit 332 of the gateway 3 using another command. The state change notice transmitting unit 333 of the gateway 3 detects manipulated to attributes of the physical interface 32 by the OS 330 of the gateway 3, and notifies all the terminals administered by the terminal managing unit 332 of the gateway 3, of the attribute change notice.

Figure 39:
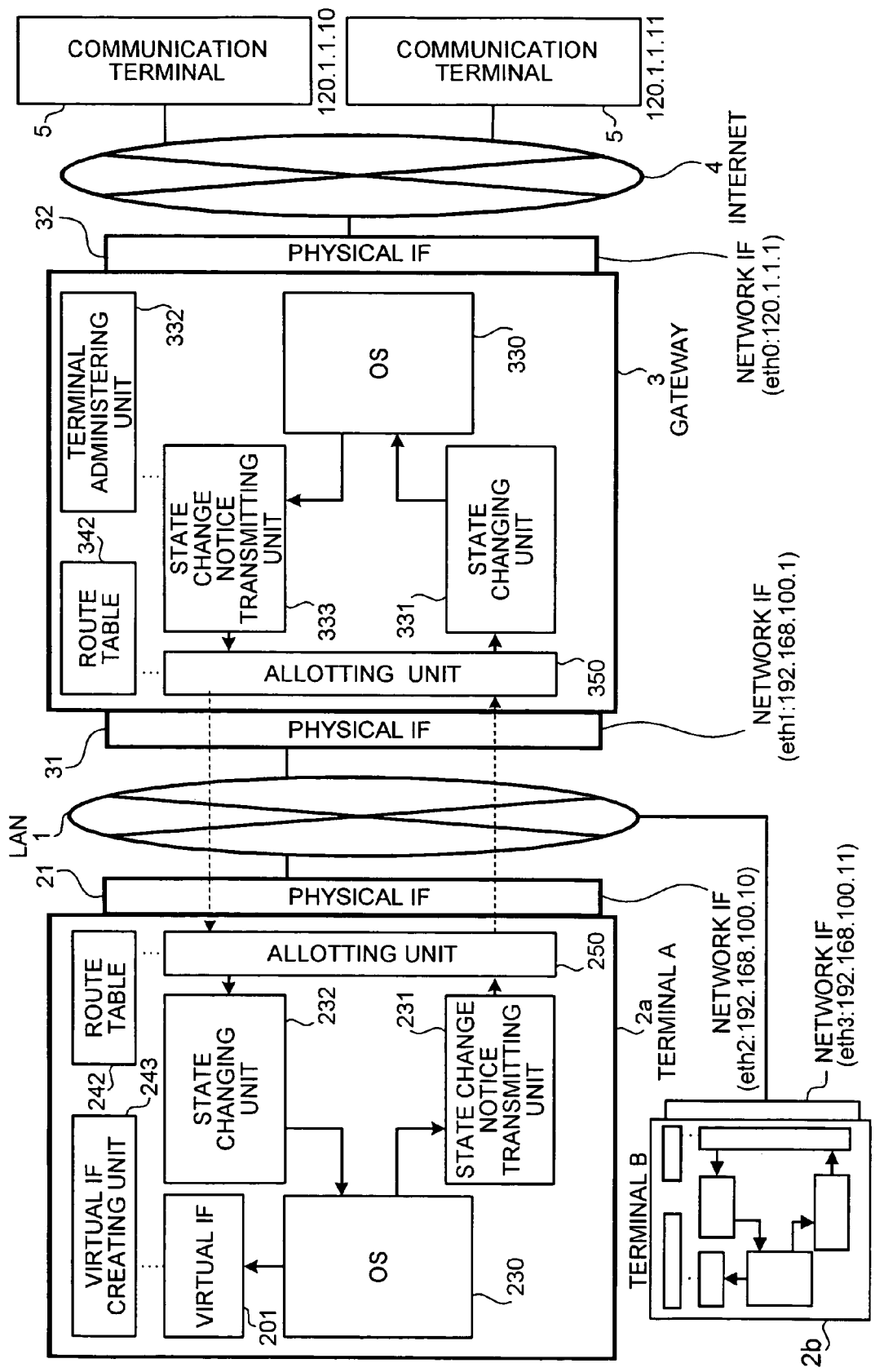
FIG. 39 is a schematic for illustrating detailed configuration of the network system according to a seventh embodiment of the present invention.

A specific example of the seventh embodiment will be described. FIG. 39 is a schematic for illustrating detailed configuration of the network system according to the seventh embodiment. As shown in FIG. 39, though the number of the terminals in the private network is not limited especially in the seventh embodiment, the example will be described with the number that is, for example, two. For convenience, the reference symbol for one terminal A is "2a" and the reference symbol for the other terminal B is "2b". The configurations of the terminal A2a, the terminal B2b, and the gateway 3 are as described above.

Figure 40:
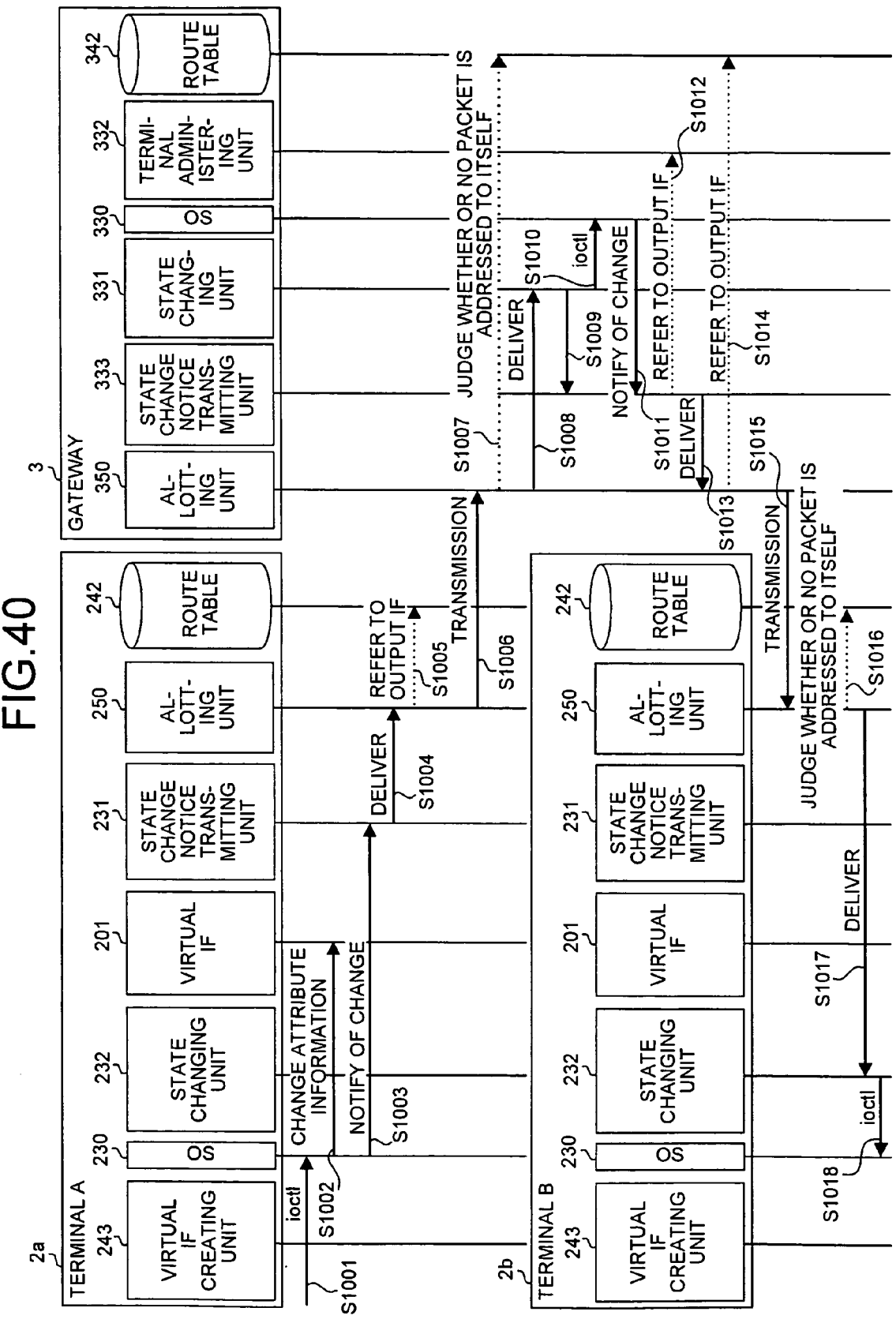
FIG. 40 is a schematic for illustrating a process sequence at the time of changing attributes of a virtual interface in the network system according to the seventh embodiment.
Figure 41:
FIG. 41 is a schematic for illustrating a terminal managing unit of the gateway according to the seventh embodiment.

A procedure for the case where attributes of the virtual interface of the terminal A are changed in a situation where the terminal A and the terminal B in the private network respectively create virtual interfaces, will be described. FIG. 40 is a schematic for illustrating a process sequence at the time of changing attributes of the virtual interface. The administrator has in advance registered the IP address, [192.168.100.10] of the terminal A2a that has created the virtual interface 201, and the IP address, [192.168.100.11] of the terminal B2b that has created another virtual interface 201 into the terminal managing unit 332 of the gateway 3. FIG. 41 illustrates the terminal managing unit 332 at this time.

The state change notice transmitting unit 231 of the terminal A2a has in advance opened a routing socket to receive the change notice of attributes of the interface from the OS 230 of the terminal A2a. As shown in FIG. 40, the administrator issues ioctl to the OS 230 of the terminal A2a to change attributes of the interface (step S1001). The OS 230 of the terminal A2a changes the state of the virtual interface 201 to the DOWN state according to the contents of ioctl (step S1002).

The OS 230 transmits the attribute change notice to the state change notice transmitting unit 231 (step S1003). The state change notice transmitting unit 231 analyzes the attribute change notice received from the OS 230, and acquires the name vif0 of the interface to be changed. Because "vif0" coincides with the name of the virtual interface 201, the state change notice transmitting unit 231 creates another attribute change notice and delivers the created notice to the allotting unit 250 of the terminal A2a (step S1004). The allotting unit 250 determines an output interface referring to the route table 242 of the terminal A2a (step 1005), and transmits the attribute change notice to the gateway 3 (step S1006).

The allotting unit 350 of the gateway 3 judges whether the attribute change notice received from the terminal A2a is addressed to the gateway 3 itself referring to the route table 342 of the gateway 3 (step S1007), and delivers the attribute change notice addressed to the gateway 3 itself to the state changing unit 331 of the gateway 3 (step S1008). When the state changing unit 331 has received the attribute change notice from the terminal A2a through the allotting unit 350, the unit 331 notifies the state change notice transmitting unit 333 of the gateway 3 of the IP address, [192.168.100.10] of the transmission origin terminal (terminal A2a) of the change notice (step S1009). The state change notice transmitting unit 333 retains the IP address, [192.168.100.10] of the terminal A2a that has been notified of from the state changing unit 331.

The state changing unit 331 acquires the contents of the change (DOWN flag) from the attribute change notice and issues "ioctl" to the OS 330 of the gateway 3 to change the state of the physical interface 32 to "DOWN" (step S1010). The state change notice transmitting unit 333 of the gateway 3 has in advance opened a routing socket to receive the change notice of attributes of the interface from the OS 330 of the gateway 3. When the OS 330 has received ioctl from the state changing unit 331, the OS 330 changes the state of the physical interface 32 to the DOWN state according to the contents of ioctl, and transmits the attribute change notice to the state change notice transmitting unit 333 (step S1011).

The state change notice transmitting unit 333 analyzes the attribute change notice received from the OS 330, and acquires the name eth0 of the interface to be changed. Because "eth0" coincides with the name of the physical interface 32, the state change notice transmitting unit 333 acquires the IP address, [192.168.100.10] of the terminal A2a and the IP address, [192.168.100.11] for which the virtual interface 201 is respectively created, referring to the terminal managing unit 332 of the gateway 3 (step S1012). The state change notice transmitting unit 333 invalidates the IP address of the terminal A2a that the unit 333 retains, creates an attribute change notice only for the IP address of the terminal B2b, and delivers this notice to the allotting unit 350 of the gateway 3 (step S1013).

The allotting unit 350 determines an output interface referring to the route table 342 of the gateway 3 (step S1014), and transmits the attribute change notice to the terminal B2b that has the IP address of [192.168.100.11] (step S1015). The route table 342 of the gateway 3 in this case is as shown in FIG. 10. The allotting unit 250 of the terminal B2b judges whether the attribute change notice received from the gateway 3 is addressed to the terminal 2 itself referring to the route table 242 of the terminal B2b (step S1016), and delivers the attribute change notice addressed to the terminal 2 itself to the state changing unit 232 of the terminal B2b (step S1017).

The state changing unit 232 acquires the contents of the change (DOWN flag) from the attribute change notice addressed to the unit 232 itself, and issues "ioctl" to the OS 230 of the terminal B2b to change the state of the virtual interface 201 to "DOWN" (step S1018), and the series of the attribute change process steps in this sequence are ended. Why the attribute change notice is not notified from the gateway 3 to the terminal A2a is because the virtual interface 201 of the terminal A2a has been already changed to the DOWN state at step S1002.

As described above, according to the above embodiments, the virtual interface 201 that corresponds to the physical interface 32 of the gateway 3 is created respectively in the terminal 2, 2a, 2b in the private network and, by using the virtual interface 201, a packet can be transmitted to the Internet 4 side using a global address given to the physical interface 32 of the gateway 3. Therefore, no conversion processing needs to be executed between a private address and a global address in the gateway 3.

According to the above embodiments, even before the terminals 2, 2a, and 2b start communicating with the Internet 4 side, communication can be started from the Internet side to the terminals 2, 2a, and 2b in the private network by using an uplink transfer paths set between the terminals 2, 2a, and 2b and the gateway 3. Therefore, even with an application that waits for a connection from the communication counterpart, an application that uses a protocol with an IP address and a port number retained in the data part thereof, an application that encrypts data, etc., the terminals 2, 2a, and 2b in the private network and the communication terminal 5 on the Internet can mutually communicate without correcting the application used.

The present invention is not limited to the above embodiments and may be altered in various ways. Any one of the above the first embodiment to the fifth embodiment, and the sixth embodiment or the seventh embodiment may be combined.

According to the embodiments described above, the terminal in the private network and the communication terminal on the Internet can directly communicate with each other. Therefore, communication between the private network and the Internet is possible without correcting applications.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network system comprising:
   a gateway arranged on a border between a public network and a private network, and configured to relay data communicated therebetween;
   a terminal located in the private network, including a virtual interface that corresponds to a physical interface of the gateway on a public network side, and configured to transmit and receive data to and from other terminals located on the public network through the virtual interface; and
   a transfer path configured to transfer data between the physical interface and the virtual interface, the data being encapsulated with a header that includes information on the gateway or the terminal located in the private network,
   wherein the header is added by the terminal and deleted by the gateway for a downlink transfer in the private network, and is added by the gateway and deleted by the terminal for an uplink transfer in the private network,
   wherein the gateway:
      determines an interface to which the data is to be output at a destination of the data using a determining unit;
      divides data to be transferred to the terminal in the private network into a plurality of pieces using a dividing unit;
      adds a header including a transmission/reception confirmation number to the pieces using a transmission/reception control unit;
      re-transmits, when no reception response to the pieces transmitted to the terminal in the private network is received from the terminal in the private network, transmitted pieces to the terminal using a re-transmission control unit;
      transmits, when data is received externally, a reception response to a source from which received data is transmitted using the re-transmission control unit; and
      re-constructs a plurality of pieces of data transferred from the terminal in the private network into original data using a reconstructing unit.

2. The network system according to claim 1, wherein the transfer path is set by opening a communication port with respect to the virtual interface by the terminal.

3. The network system according to claim 1, wherein
   the terminal includes a first transmitting unit configured to transmit, to the gateway, information on a change in attributes of the virtual interface, and
   the gateway includes a first changing unit configured to reflect the change of attributes in attributes of the physical interface.

4. The network system according to claim 3, wherein
   the gateway includes
      a managing unit configured to manage at least one terminal having the virtual interface that corresponds to the physical interface; and
      a second transmitting unit configured to transmit information on a change in attributes of the physical interface to the terminal, and
   the terminal includes a second changing unit configured to reflect the change of attributes in attributes of the virtual interface.

5. The network system according to claim 4, wherein,
   a plurality of terminals are arranged on the private network, and
   the first transmitting unit is configured to transmit, when the gateway receives the information on the change in attributes of the virtual interface from the first transmitting unit of one of the terminals, the information on the change in attributes of the physical interface, to all of the terminals except for the one of the terminals.

6. A method of corresponding between a terminal comprising a virtual interface and a gateway arranged on a border between a public network and a private network, comprising:
   relaying data communicated between the public network and the private network using the gateway,
   wherein the virtual interface is configured to correspond to a physical interface of the gateway on a public network side;
   wherein the terminal is located in the private network and configured to transmit and receive data to and from other terminals located on the public network through the virtual interface using a global address assigned to the physical interface, the data being encapsulated between the terminal and the gateway with a header that includes information on the gateway or the terminal, and
   wherein the header is added by the terminal and deleted by the gateway for a downlink transfer in the private network, and is added by the gateway and deleted by the terminal for an uplink transfer in the private network;
   communicating with the other terminals using a communicating unit of the terminal;
   transferring data to the gateway using a path setting unit configured to seta downlink transfer path;
   transferring data that has been transmitted to the virtual interface from the communicating unit, through the downlink transfer path using a transferring unit to he gateway;
   receiving data transferred through the gateway at a receiving unit;
   delivering received data to the communicating unit through the virtual interface using said receiving unit;
   adding the header to the data to be transferred to the gateway using a destination setting unit;
   determining an interface to which the data is to be output at a destination of the data using a determining unit;
   deleting the header from data addressed to the terminal and transferred from the gateway us deleting unit;
   dividing data to be transferred to the gateway into a plurality of pieces using a dividing unit;

adding a header including a transmission/reception confirmation number, to the pieces using a transmission/reception control unit;

re-transmitting, when no reception response to the pieces transmitted to the gateway is received from the gateway, transmitted pieces to he gateway using a re-transmission control unit;

transmitting, when data is received externally, a reception response to a source from which received data is transmitted using the re-transmission control unit; and reconstructing a plurality of pieces of data transferred from the gateway into original data using a reconstructing unit.

7. The method according to claim 6, further comprising:

adding an identifier indicating that data is processed by the gateway to data transferred to the gateway using an identifier setting unit;

judging whether data is processed based on a type of the identifier using an identifier judging unit; and deleting an attached identifier, when the identifier judging unit judges data to be processed, using an identifier deleting unit.

8. A method for relaying data using a gateway in a network system that includes the gateway that is arranged on a border between a public network and a private network that relays data communicated therebetween, a terminal that is located in the private network, that includes a virtual interface corresponding to a physical interface of the gateway on a public network side, and that transmits and receives data to and from other terminals located on the public network through the virtual interface using a global address assigned to the physical interface, comprising:

setting an uplink transfer path for transferring data to the terminal located in the private network using a path setting unit;

transferring data received from a terminal on the public network, to the terminal in the private network through the uplink transfer path using a data transferring unit, the data being encapsulated with a first header that includes information on the terminal located in the private network;

receiving data transferred from the terminal in the private network using a data receiving unit, the data being encapsulated with a second header that includes information on the gateway and to transmit the data to the public network;

adding the first header to the data to be transferred to the terminal in the private network using a destination setting unit;

deleting the header from the data addressed to the gateway and transferred from the terminal in the private network using a deleting unit, wherein the header is added by the terminal and deleted by the gateway for a downlink transfer in the private network, and is added by the gateway and deleted by the terminal for an uplink transfer in the private network;

determining an interface to which the data is to be output at a destination of the data using a determining unit;

dividing data to be transferred to the terminal in the private network into a plurality of pieces using a dividing unit;

adding a header including a transmission/reception confirmation number to the pieces using a transmission/reception control unit;

re-transmitting, when no reception response to the pieces transmitted to the terminal in the private network is received from the terminal in the private network, transmitted pieces to the terminal using a re-transmission control unit;

transmitting, when data is received externally, a reception response to a source from which received data is transmitted using the re-transmission control unit; and re-constructing a plurality of pieces of data transferred from the terminal in the private network into original data using a reconstructing unit.

9. The method according to claim 8, further comprising:

determining a terminal to be a transfer destination, from among a plurality of terminals located in the private network, based on a destination port number of data received from the terminal on the public network using a destination determining unit.

10. The method according to claim 8, further comprising:

adding an identifier indicating that data is processed by the terminal to data transferred to the terminal in the private network using an identifier setting unit;

judging whether data is processed based on a type of the identifier using an identifier judging unit; and deleting an attached identifier, using an identifier deleting unit, when the identifier judging unit judges data to be processed.

* * * * *